(12) United States Patent
Lai et al.

(10) Patent No.: US 11,240,190 B2
(45) Date of Patent: *Feb. 1, 2022

(54) SOCIAL NETWORK COMMUNITIES

(71) Applicant: salesforce.com, inc., San Francisco, CA (US)

(72) Inventors: Sanjaya Lai, South San Francisco, CA (US); Aditya Sesha Kuruganti, Palo Alto, CA (US); Kedar Doshi, Palo Alto, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,165

(22) Filed: Jan. 24, 2019

(65) Prior Publication Data

US 2019/0158452 A1 May 23, 2019

Related U.S. Application Data

(63) Continuation of application No. 15/711,249, filed on Sep. 21, 2017, now Pat. No. 10,218,667, which is a
(Continued)

(51) Int. Cl.
*G06F 15/16* (2006.01)
*G06F 3/01* (2006.01)
(Continued)

(52) U.S. Cl.
CPC .............. *H04L 51/32* (2013.01); *G06Q 10/10* (2013.01); *G06Q 50/01* (2013.01); *H04L 65/40* (2013.01); *H04L 12/1818* (2013.01)

(58) Field of Classification Search
CPC ..... H04L 51/32; H04L 65/40; H04L 12/1818; G06Q 10/10; G06Q 50/01
(Continued)

(56) References Cited

U.S. PATENT DOCUMENTS 868,605 A 10/1907 Heybach
5,577,188 A 11/1996 Zhu
(Continued)

OTHER PUBLICATIONS

U.S. Office Action dated Feb. 18, 2015 issued in U.S. Appl. No. 13/804,246.
(Continued)

*Primary Examiner* — Kevin T Bates
*Assistant Examiner* — Golam Mahmud
(74) *Attorney, Agent, or Firm* — Weaver Austin Villeneuve & Sampson LLP

(57) ABSTRACT

Disclosed are methods, apparatus, systems, and computer-readable storage media for providing access to communities of users in an online social network. In some implementations, a server is configured to identify a user identity (ID), received from a computing device, as one of a plurality of first user identities (IDs) of first users belonging to a first community maintained on behalf of a first organization by a social networking system. The computing device can then be provided access to the first community. When a request to access a second community maintained on behalf of a second organization is received from the computing device, the user ID can be identified as one of a plurality of second user IDs of second users belonging to the second community. The computing device can then be provided access to the second community.

20 Claims, 33 Drawing Sheets

Related U.S. Application Data continuation of application No. 13/804,246, filed on Mar. 14, 2013, now Pat. No. 9,832,156.

(60) Provisional application No. 61/614,832, filed on Mar. 23, 2012.

(51) Int. Cl.

| | | |
|---|---|---|
| *H04L 9/32* | (2006.01) | |
| *G06F 21/00* | (2013.01) | |
| *G06F 15/173* | (2006.01) | |
| *H04L 12/58* | (2006.01) | |
| *G06Q 50/00* | (2012.01) | |
| *G06Q 10/10* | (2012.01) | |
| *H04L 29/06* | (2006.01) | |
| *H04L 12/18* | (2006.01) | |

(58) Field of Classification Search
USPC .................................................. 709/225
See application file for complete search history.

(56) References Cited

U.S. PATENT DOCUMENTS

| | | | |
|---|---|---|---|
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 5,983,227 | A | 11/1999 | Nazem et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,133 | B1 | 4/2001 | Masthoff |
| 6,216,135 | B1 | 4/2001 | Brodersen et al. |
| 6,233,617 | B1 | 5/2001 | Rothwein et al. |
| 6,236,978 | B1 | 5/2001 | Tuzhilin |
| 6,266,669 | B1 | 7/2001 | Brodersen et al. |
| 6,288,717 | B1 | 9/2001 | Dunkle |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,411,949 | B1 | 6/2002 | Schaffer |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec et al. |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B2 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 6,907,566 | B1 | 6/2005 | McElfresh et al. |
| 7,062,502 | B1 | 6/2006 | Kesler |
| 7,069,231 | B1 | 6/2006 | Cinarkaya et al. |
| 7,069,308 | B2 * | 6/2006 | Abrams .................. G06Q 10/10 705/319 |
| 7,069,497 | B1 | 6/2006 | Desai |
| 7,093,020 | B1 | 8/2006 | McCarty et al. |
| 7,100,111 | B2 | 8/2006 | McElfresh et al. |
| 7,181,758 | B1 | 2/2007 | Chan |
| 7,269,590 | B2 | 9/2007 | Hull et al. |
| 7,289,976 | B2 | 10/2007 | Hneman et al. |
| 7,340,411 | B2 | 3/2008 | Cook |
| 7,356,482 | B2 | 4/2008 | Frankland et al. |
| 7,373,599 | B2 | 5/2008 | McElfresh et al. |
| 7,401,094 | B1 | 7/2008 | Kesler |
| 7,406,501 | B2 | 7/2008 | Szeto et al. |
| 7,412,455 | B2 | 8/2008 | Dillon |
| 7,454,509 | B2 | 11/2008 | Boulter et al. |
| 7,508,789 | B2 | 3/2009 | Chan |
| 7,599,935 | B2 | 10/2009 | La Rotonda et al. |
| 7,603,331 | B2 | 10/2009 | Tuzhilin et al. |
| 7,603,483 | B2 | 10/2009 | Psounis et al. |
| 7,620,655 | B2 | 11/2009 | Larsson et al. |
| 7,644,122 | B2 | 1/2010 | Weyer et al. |
| 7,668,861 | B2 | 2/2010 | Steven |
| 7,694,017 | B2 * | 4/2010 | Saitoh ............... H04L 29/12018 709/245 |
| 7,698,160 | B2 | 4/2010 | Beaven et al. |
| 7,730,478 | B2 | 6/2010 | Weissman |
| 7,747,648 | B1 | 6/2010 | Kraft et al. |
| 7,779,039 | B2 | 8/2010 | Weissman et al. |
| 7,779,475 | B2 | 8/2010 | Jakobson et al. |
| 7,827,208 | B2 | 11/2010 | Bosworth et al. |
| 7,853,881 | B1 * | 12/2010 | Assal ..................... G06Q 10/10 715/734 |
| 7,945,653 | B2 | 5/2011 | Zukerberg et al. |
| 8,005,896 | B2 | 8/2011 | Cheah |
| 8,014,943 | B2 | 9/2011 | Jakobson |
| 8,015,495 | B2 | 9/2011 | Achacoso et al. |
| 8,032,297 | B2 | 10/2011 | Jakobson |
| 8,073,850 | B1 | 12/2011 | Hubbard et al. |
| 8,082,301 | B2 | 12/2011 | Ahlgren et al. |
| 8,095,413 | B1 | 1/2012 | Beaven |
| 8,095,531 | B2 | 1/2012 | Weissman et al. |
| 8,095,594 | B2 | 1/2012 | Beaven et al. |
| 8,103,611 | B2 | 1/2012 | Tuzhilin et al. |
| 8,131,580 | B2 | 3/2012 | Doshi et al. |
| 8,150,913 | B2 | 4/2012 | Cheah |
| 8,209,308 | B2 | 6/2012 | Rueben et al. |
| 8,209,333 | B2 | 6/2012 | Hubbard et al. |
| 8,275,836 | B2 | 9/2012 | Beaven et al. |
| 8,326,674 | B2 | 12/2012 | Doshi et al. |
| 8,326,675 | B2 | 12/2012 | Doshi et al. |
| 8,407,205 | B2 | 3/2013 | Doshi et al. |
| 8,452,726 | B2 | 5/2013 | Kuruganti et al. |
| 8,457,545 | B2 | 6/2013 | Chan |
| 8,473,518 | B1 | 6/2013 | Yancy et al. |
| 8,478,782 | B1 | 7/2013 | Kuruganti et al. |
| 8,484,111 | B2 | 7/2013 | Frankland et al. |
| 8,490,025 | B2 | 7/2013 | Jakobson et al. |
| 8,504,945 | B2 | 8/2013 | Jakobson et al. |

(56) References Cited

U.S. PATENT DOCUMENTS

| | | |
|---|---|---|
| 8,510,045 B2 | 8/2013 | Rueben et al. |
| 8,510,664 B2 | 8/2013 | Rueben et al. |
| 8,527,323 B2 | 9/2013 | Doshi et al. |
| 8,548,982 B2 | 10/2013 | Weissman et al. |
| 8,560,571 B1 | 10/2013 | Kuruganti et al. |
| 8,566,301 B2 | 10/2013 | Rueben et al. |
| 8,577,835 B2 | 11/2013 | Doshi et al. |
| 8,595,146 B1 | 11/2013 | Liew |
| 8,646,103 B2 | 2/2014 | Jakobson et al. |
| 8,661,076 B2* | 2/2014 | Herman .................. H04L 67/26 709/203 |
| 8,738,620 B2* | 5/2014 | Lee ........................ G06Q 10/10 707/736 |
| 8,812,346 B2 | 8/2014 | Doshi et al. |
| 8,818,940 B2 | 8/2014 | Lai et al. |
| 8,856,066 B2 | 10/2014 | Kuruganti et al. |
| 9,027,116 B2* | 5/2015 | Short, III ............. H04L 63/029 726/15 |
| 9,053,136 B2 | 6/2015 | Kuruganti et al. |
| 9,178,753 B2 | 11/2015 | Micucci et al. |
| 9,207,832 B1* | 12/2015 | Khouri ................. G06Q 10/10 |
| 9,208,187 B2* | 12/2015 | Dunn .................... G06Q 50/01 |
| 9,251,164 B2 | 2/2016 | Doshi et al. |
| 9,275,253 B2 | 3/2016 | Kuruganti et al. |
| 9,286,364 B2 | 3/2016 | Kuruganti et al. |
| 9,292,534 B2 | 3/2016 | Kuruganti et al. |
| 9,361,366 B1* | 6/2016 | Yancey ................. G06F 21/604 |
| 9,378,392 B2 | 6/2016 | Weissman et al. |
| 9,411,852 B2 | 8/2016 | Yancy et al. |
| 9,703,799 B2 | 7/2017 | Kuruganti et al. |
| 9,715,555 B2 | 7/2017 | Doshi et al. |
| 9,760,844 B2 | 9/2017 | Doshi et al. |
| 9,798,813 B2 | 10/2017 | Walters et al. |
| 9,832,156 B2 | 11/2017 | Lai et al. |
| 9,934,473 B2 | 4/2018 | Doshi et al. |
| 10,158,638 B2 | 12/2018 | Micucci et al. |
| 10,218,667 B2 | 2/2019 | Lai et al. |
| 10,324,901 B2 | 6/2019 | Kuruganti et al. |
| 10,324,946 B2 | 6/2019 | Janson et al. |
| 10,410,013 B2 | 9/2019 | Weissman et al. |
| 10,482,141 B2 | 11/2019 | Mcguire et al. |
| 10,558,685 B2 | 2/2020 | Kuruganti et al. |
| 10,715,525 B2 | 7/2020 | Micucci et al. |
| 10,824,559 B2 | 11/2020 | Khan et al. |
| 10,997,260 B2 | 5/2021 | Mcguire et al. |
| 11,010,305 B2 | 5/2021 | Khan et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0050976 A1* | 3/2003 | Block ................... H04L 63/105 709/203 |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0110161 A1 | 6/2003 | Schneider |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0144241 A1 | 6/2005 | Stata et al. |
| 2007/0150603 A1* | 6/2007 | Crull ....................... H04L 63/08 709/227 |
| 2007/0174448 A1 | 7/2007 | Ahuja et al. |
| 2007/0245002 A1* | 10/2007 | Nguyen ............. G06F 21/6227 709/223 |
| 2008/0177637 A1* | 7/2008 | Weiss ..................... G06Q 40/04 705/26.1 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0106822 A1* | 4/2009 | Obasanjo ............... G06Q 50/01 726/4 |
| 2009/0177744 A1 | 7/2009 | Marlow et al. |
| 2009/0187915 A1 | 7/2009 | Chew et al. |
| 2009/0187916 A1 | 7/2009 | Liu et al. |
| 2010/0074236 A1* | 3/2010 | Takeda ................... H04W 24/04 370/338 |
| 2010/0153282 A1* | 6/2010 | Graham ................. G06Q 10/10 705/310 |
| 2010/0229221 A1* | 9/2010 | Tam ...................... G06Q 40/025 726/4 |
| 2010/0296455 A1* | 11/2010 | Nakajima ............. H04W 16/00 370/328 |
| 2011/0004927 A1* | 1/2011 | Zlowodzki ........... G06F 21/335 726/7 |
| 2011/0055911 A1* | 3/2011 | Adelman ............. H04L 63/0823 726/7 |
| 2011/0087604 A1* | 4/2011 | Chung ................. G06Q 10/103 705/301 |
| 2011/0113058 A1* | 5/2011 | Lee ........................ G06Q 10/10 707/769 |
| 2011/0179020 A1* | 7/2011 | Ozzie ..................... G06F 16/958 707/723 |
| 2011/0218958 A1 | 9/2011 | Warshavsky et al. |
| 2011/0225495 A1* | 9/2011 | Casalaina ............. G06Q 30/016 715/716 |
| 2011/0247051 A1 | 10/2011 | Bulumulla et al. |
| 2011/0252463 A1* | 10/2011 | Yeleshwarapu ..... G06F 21/6218 726/7 |
| 2011/0307695 A1* | 12/2011 | Slater ................... G06F 21/604 713/163 |
| 2012/0042218 A1 | 2/2012 | Cinarkaya et al. |
| 2012/0227077 A1* | 9/2012 | Spivack ............... G06F 16/9535 725/110 |
| 2012/0233137 A1 | 9/2012 | Jakobson et al. |
| 2012/0233253 A1* | 9/2012 | Ricci .................... G06Q 50/01 709/204 |
| 2012/0290407 A1 | 11/2012 | Hubbard et al. |
| 2013/0073473 A1* | 3/2013 | Heath .................... G06Q 30/06 705/319 |
| 2013/0091280 A1* | 4/2013 | Rajakarunanayake ..................... H04L 63/105 709/225 |
| 2013/0159519 A1* | 6/2013 | Hochberg ........... G06Q 20/4015 709/225 |
| 2013/0173344 A1* | 7/2013 | Kundagrami .......... G06Q 40/02 705/7.32 |
| 2013/0173798 A1 | 7/2013 | Micucci et al. |
| 2013/0174275 A1 | 7/2013 | Micucci et al. |
| 2013/0212497 A1 | 8/2013 | Zelenko et al. |

(56) References Cited

U.S. PATENT DOCUMENTS

| | | | |
|---|---|---|---|
| 2013/0218948 | A1 | 8/2013 | Jakobson |
| 2013/0218949 | A1 | 8/2013 | Jakobson |
| 2013/0218966 | A1 | 8/2013 | Jakobson |
| 2013/0247216 | A1 | 9/2013 | Cinarkaya et al. |
| 2013/0254296 | A1 | 9/2013 | Lai et al. |
| 2013/0254397 | A1 | 9/2013 | Lai et al. |
| 2014/0019880 | A1 | 1/2014 | Kucera et al. |
| 2014/0359537 | A1 | 12/2014 | Jakobson et al. |
| 2015/0006289 | A1 | 1/2015 | Jakobson et al. |
| 2015/0007050 | A1 | 1/2015 | Jakobson et al. |
| 2015/0095162 | A1 | 4/2015 | Jakobson et al. |
| 2015/0142596 | A1 | 5/2015 | Jakobson et al. |
| 2015/0172563 | A1 | 6/2015 | Jakobson et al. |
| 2018/0109485 | A1 | 4/2018 | Lai et al. |

OTHER PUBLICATIONS

U.S. Final Office Action dated Aug. 21, 2015 issued in U.S. Appl. No. 13/804,246.

U.S. Office Action dated Mar. 4, 2016 issued in U.S. Appl. No. 13/804,246.

U.S. Office Action dated Jun. 22, 2016 issued in U.S. Appl. No. 13/804,246.

U.S. Final Office Action dated Jan. 31, 2017 issued in U.S. Appl. No. 13/804,246.

U.S. Notice of Allowance dated Jun. 15, 2017 issued in U.S. Appl. No. 13/804,246.

U.S. Notice of Allowance [Corrected Notice of Allowability] dated Oct. 12, 2017 issued in U.S. Appl. No. 13/804,246.

U.S. Office Action dated Feb. 26, 2015 issued in U.S. Appl. No. 13/804,645.

U.S. Final Office Action dated Nov. 4, 2015 issued in U.S. Appl. No. 13/804,645.

U.S. Office Action dated Mar. 24, 2016 issued in U.S. Appl. No. 13/804,645.

U.S. Final Office Action dated Dec. 9, 2016 issued in U.S. Appl. No. 13/804,645.

U.S. Notice of Allowance dated Oct. 19, 2018 issued in U.S. Appl. No. 15/711,249.

U.S. Office Action dated Jan. 30, 2015 issued in U.S. Appl. No. 13/804,739.

U.S. Final Office Action dated Jun. 19, 2015 issued in U.S. Appl. No. 13/804,739.

U.S. Office Action dated Nov. 30, 2015 issued in U.S. Appl. No. 13/804,739.

U.S. Final Office Action dated Apr. 29, 2016 issued in U.S. Appl. No. 13/804,739.

U.S. Office Action dated Oct. 3, 2016 issued in U.S. Appl. No. 13/804,739.

U.S. Final Office Action dated Mar. 21, 2017 issued in U.S. Appl. No. 13/804,739.

"Tibbr Communities: A Better Way To Manage Extranets and Social Sprawl," (Jul. 26, 2011) [retrieved on Jun. 22, 2015 from Internet at http://www.tibbr.com/blog/product-updates/tibbr-communities-a-better-way-to-manage-extranets-and-social-sprawl/, 3 pages.

"Google Plus Users", Google+Ripples, Oct. 31, 2011 [retrieved on Feb. 21, 2012 from Internet at http://www.googleplusers.com/google-ripples.html], 3 pages.

\* cited by examiner

| Org-Community | User Type | Role | Privileges (Access Model) |
|---|---|---|---|
| A-1 | Internal | Employee | Data: Unlimited<br>Actions: Unlimited |
| A-2 | External | Customer | Data: Unlimited<br>Actions: Unlimited |
| | | Partner | |
| | [Public] | | Data: Unlimited<br>Actions: Unlimited |
| A-3 | Internal | Employee | Data: Unlimited<br>Actions: Unlimited |
| | | Partner | Data: Limited (Model ___)<br>Actions: Unlimited |
| | External | Customer | Data: Limited (Model ___)<br>Actions: Limited |

*FIGURE 5*

| Community ←608 | Community Type ←632 | Org ←636 | User Type ←640 | User Role ←644 | Access Model ←604 |
|---|---|---|---|---|---|
| A-1 | Private | A | Internal | Employee | Pr-A-I-E |
| A-2 | Public | A | | | Public |
| 2 | Public | C | | | Public |
| 3 | Private | B | External | Customer | Pr-B-E-C |
| 4 | Private | D | Internal | Partner | Pr-D-I-P |

On his Profile, he is prompted to link to a social network to easily complete his profile.....

FIGURE 15

From her profile page, he posts his question directly to Mary...

She comments publicly to the case letting Eddie know that she will get back to him within 48 hours.

From the My Communities view, Mary can monitor multiple communities side-by-side...

From the Communities menu, Georgia can easily create a new community...

FIGURE 27

And choose from a few quick & easy Community templates...

FIGURE 28

She gives her community a name and description and sets it to invite-only.

SOCIAL NETWORK COMMUNITIES

PRIORITY DATA

This patent document is a continuation of and claims priority to co-pending and commonly assigned U.S. patent application Ser. No. 15/711,249, titled "Social Network Communities", by Lai et al., filed Sep. 21, 2017, which is a continuation of and claims priority to U.S. patent application Ser. No. 13/804,246, titled "Social Networking System Communities and Associated User Privileges Implemented Using a Database System", by Lai et al., filed Mar. 14, 2013, which claims priority to U.S. Provisional Patent Application No. 61/614,832, titled "Chatter Community", by Lai et al., filed on Mar. 23, 2012. Each of U.S. patent application Ser. No. 15/711,249, U.S. patent application Ser. No. 13/804,246 and U.S. Provisional Patent Application No. 61/614,832 is hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document relates generally to providing on-demand services in an online social network using a database system and, more specifically, to techniques for associating users of the social network.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Database resources can be provided in a cloud computing context. However, using conventional database management techniques, it is difficult to know about the activity of other users of a database system in the cloud or other network. For example, the actions of a particular user, such as a salesperson, on a database resource may be important to the user's boss. The user can create a report about what the user has done and send it to the boss, but such reports may be inefficient, not timely, and incomplete. Also, it may be difficult to identify other users who might benefit from the information in the report.

BRIEF DESCRIPTION OF THE DRAWINGS

The included drawings are for illustrative purposes and serve only to provide examples of possible structures and operations for the disclosed inventive systems, apparatus, methods and computer-readable media for providing communities of users in an online social network. These drawings in no way limit any changes in form and detail that may be made by one skilled in the art without departing from the spirit and scope of the disclosed implementations.

FIG. 5 shows an example of a privileges table 500 identifying rights and restrictions of users to access data and initiate actions in one or more communities according to one or more attributes, according to some implementations.

FIG. 6 shows an example of a privileges table 600 identifying different access models governing permissions of users to access data and initiate actions in one or more communities according to one or more attributes, according to some implementations.

FIGS. 11-30 show examples of pages in the form of GUIs as displayed on display devices for interacting with communities in an online social network, according to some implementations.

DETAILED DESCRIPTION

Figure 1:
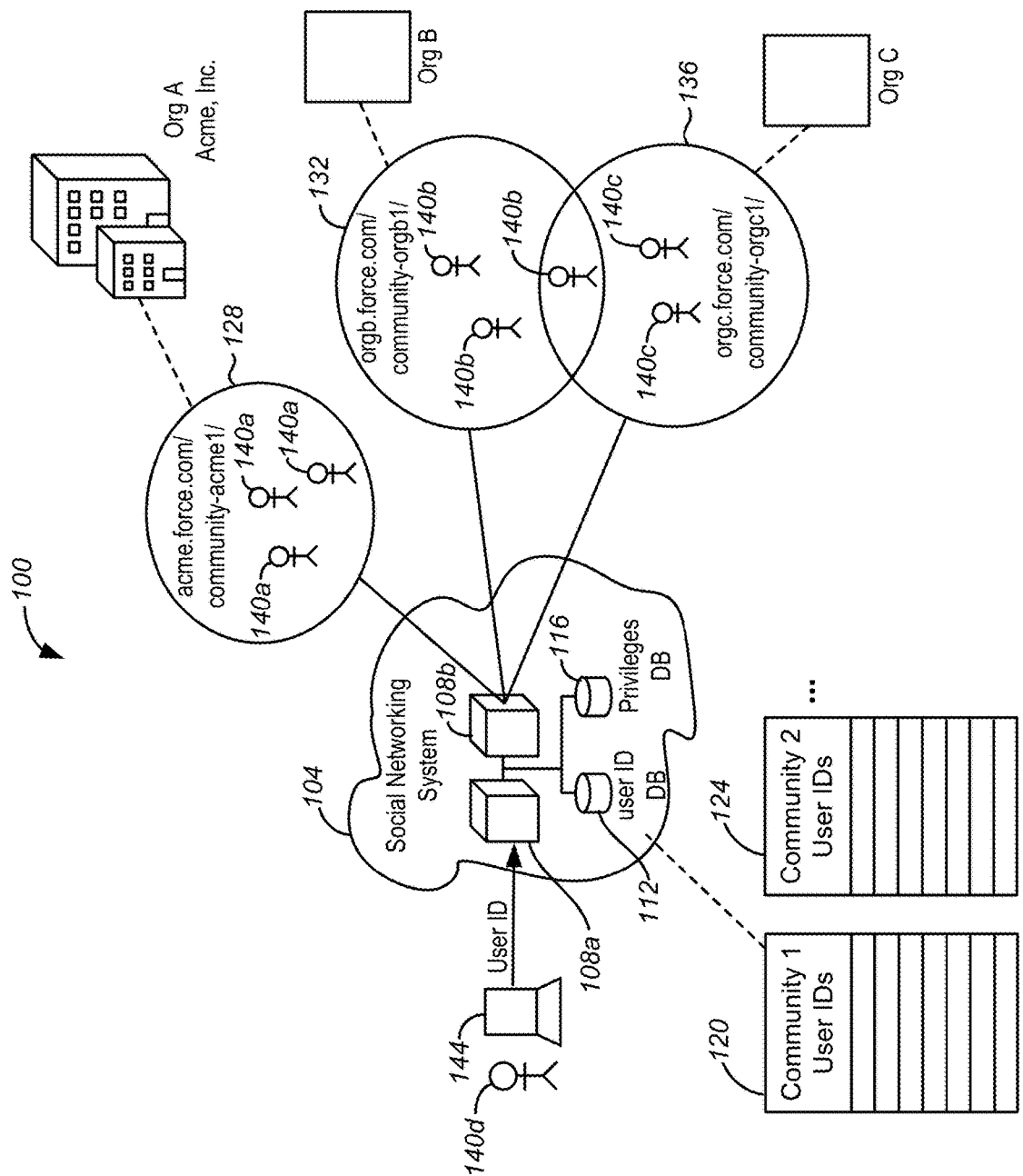
FIG. 1 shows a system diagram of an example of a social networking environment 100 with communities according to some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different systems, apparatus, methods and computer-readable storage media for defining, maintaining, and providing access to communities of users in an online social network, also referred to herein as a social networking system. One example of an online social network is Chatter®, provided by salesforce.com, inc. of San Francisco, Calif. salesforce.com, inc. is a provider of social networking services, customer relationship management (CRM) services and other database management services. These various services can be provided in a cloud computing environment, for example, in the context of a multi-tenant database system. Different communities of users can be created and managed in such an environment without having to install software locally, that is, on computing devices of users accessing the communities. While the disclosed implementations are often described with reference to Chatter®, those skilled in the art should understand that the disclosed systems, apparatus, methods and computer-readable storage media can be implemented in the context of one or more other social networking systems, such as Facebook®, LinkedIn®, Twitter®, Google+®, Yammer® and Jive®.

Some implementations of the disclosed systems, apparatus, methods and computer-readable storage media are configured to provide communities of users in an online social network. Such communities are to be differentiated from "groups" of users in Chatter®, described in greater detail below. That is, a community of users can exist as an entity apart from and in addition to any group or groups of such users in the social network, although some of the rights and restrictions provided to a community member may be the same or similar as those provided to a member of a group.

In some implementations, a community can be defined as a secure space for different stake-holders of an organization, such as employees, customers and partners of the organization, to collaborate with one another by accessing shared data, interacting with community-centric tasks and business processes, and using conversational services such as chat sessions, feed-based communication, and private messaging. The community can be structured and maintained as a public or private space for users having different relationships with the organization, so the users can converse and collaborate in an effective manner. The users can be of different types, such as internal or external, and/or the users can have different roles, such as employee, customer or partner, with such types and roles defining a user's relationship with the organization. For example, a partner can be an entity external to an organization that sells services and/or provides support on behalf of an employee, who is an internal user of the organization. Multiple communities can be implemented, some affiliated with different organizations, and a user can navigate across the communities in a seamless fashion from the user's perspective.

In some instances, the community can provide various collaboration tools in a branded environment, for example, with community-specific web pages providing names, trademarks, themes, colors and other indicia of products, services, and/or an organization offering the product or service. Thus, a community can be a space with a branded look-and-feel for people to collaborate on data pertaining to the community and often pertaining to an organization with which the community is affiliated.

Each community can be structured so a community leader, system administrator or other user having appropriate security clearance can define rules governing community membership and privileges governing: i) access and use of various community data, ii) the ability to take action and cause events to occur in relation to the community, and iii) the visibility of users to each other. These various privileges can be defined and customized at a granular level, for instance, with different access rights and restrictions configured on a per-user or per-type of user basis, on a per-data item or per-type of data basis, and/or on a per-action or per-type of action basis.

In some instances, a user can have different user profiles for different communities. In other instances, a user can have a primary user profile and can select which fields of the profile are to be exposed to each community of which the user is a member. In some implementations, a user's community profile has a child-parent relationship with the primary profile and is tailored to inherit data from selected fields of the primary profile.

In some instances, a community can be open, as is often the case with public communities, in that there are no or minimal restrictions on users to access data, initiate actions, and view other community members' profiles, regardless of user type or role with respect to an organization. Thus, in a public community, employees, customers and partners of an organization affiliated with the community can freely view community data and each other's profiles, follow the same objects, and converse using the same feeds, by virtue of being members of the same community.

In some implementations of the disclosed communities, the same user identity (ID), such as a login name or email address assigned to a given user, can be used by a user to directly log in and thus gain access to a community, that is, without requiring the user to separately log in to the social networking system hosting the community, as well as allow the user navigate across multiple communities during a web browsing session. Thus, for example, a user is not required to supply login credentials each time the user clicks through a web page of a first community to a page of a second community. A single user ID can be used to navigate across various communities, some of which can belong to different organizations.

In some implementations, full collaboration in a community is possible regardless of user type or role. Internal and external users can be provided with full access or the same level of restricted access to the same feeds available through the community, and such users can view each other's walls and follow each other. The various types and/or roles of users can have the same rights to access and edit CRM records such as opportunities, leads, contacts, accounts, cases, etc. and collaborate with each other regarding such data using feeds. CRM data and files can traverse community boundaries, that is, such that members of different communities may have privileges to access and interact with the same CRM records.

The branding of a community can include custom network addresses such as uniform resource locators (URLs) with brand names included in a string of characters defining the URL. Thus, each community provided in an online social network can have a unique and branded URL customized to refer to a product, service, and/or organization by brand name. The branding of a community can also or alternatively include themes and color options presented as parts of one or more community pages to provide a look-and-feel identifying a brand of an organization. The navigation options for community pages can also be customized to include specific tabs and other components presented in a graphical user interface (GUI) that identify a brand or aspects of a brand associated with an organization.

Branding data in a community can be different from and can exclude any brands of the social networking system hosting the community. For instance, a community maintained in Chatter® can have pages with logos, themes and color schemes identifying an organization such as Burberry®, with which the community is affiliated, while the pages specifically exclude any logos, slogans or graphical images identifying Chatter® or salesforce.com. In this example, the Burberry® logos, themes and color schemes can be retrieved from the Burberry® website. Other communities can similarly include branding of other organizations, even though all of the communities are maintained on a social networking system provided by salesforce.com, inc. or another social network provider.

The sharing of files and visibility of users and user-submitted messages can be customized according to who is the user attempting to access such data, who is the user owning or having submitted the data, what is the type of data file or message, and/or what is the action requested with respect to the data. One community member may have limited privileges to access .doc documents but may be prevented from accessing .xls documents and CRM records. Another member of the same community may have unlimited privileged to access and interact with these documents and records. Different rights and restrictions with respect to viewing and interacting with feed items in a feed can be similarly custom-tailored for different users or types of users in a given community.

File libraries can be maintained, where a type or role of user is granted access to a library and, thus, is granted access to all of the files in that library. In some implementations, external users can be restricted from editing the content of such files, while internal users can freely do so. In some community implementations, file collaboration and editing privileges can be granted to both external and internal users, and users have the ability to choose whether to upload or share a file or other data in a community, knowing that other various types of users within the community would have the ability to freely view, collaborate about, and edit that data. In some instances, a community can be configured to prevent certain users from sharing files outside of the community. Thus, a file could be accessible in community A and not in community B. Additionally, one file may be public—viewable by users having various roles and/or types—in community A, but be private—viewable only by users having specified roles and/or types—in community B.

In some implementations, a system administrator defines who can see whom in a community. The community can be configured to have an open model in which every member can see every other member's profile and/or contact information. In other instances, a community can have a more restricted model, for instance, in which external users can view other external users' profiles but be blocked from accessing or viewing internal users' profiles and/or contact information. Such access models can be extended to determine which feeds, feed items, records, record updates, groups and other social network constructs a particular type or role of user can access.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

Online social networks are increasingly becoming a common way to facilitate communication among people who can be recognized as users of a social networking system. Some online social networks can be implemented in various settings, including organizations, e.g., enterprises such as companies or business partnerships, academic institutions, or groups within such an organization. For instance, Chatter® can be used by employee users in a division of a business organization to share data, communicate, and collaborate with each other for various purposes.

In some online social networks, users can access one or more information feeds, which include information updates presented as items or entries in the feed. Such a feed item can include a single information update or a collection of individual information updates. A feed item can include various types of data including character-based data, audio data, image data and/or video data. An information feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, an online social network may allow a user to follow data objects in the form of records such as cases, accounts, or opportunities, in addition to following individual users and groups of users. The "following" of a record stored in a database, as described in greater detail below, allows a user to track the progress of that record. Updates to the record, also referred to herein as changes to the record, are one type of information update that can occur and be noted on an information feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and hyperlinks to social network data or other network data such as various documents and/or web pages on the Internet. Posts can include alphanumeric or other character-based user inputs such as words, phrases, statements, questions, emotional expressions, and/or symbols. Comments generally refer to responses to posts, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed, also referred to herein as the user's "wall," which is one example of an information feed displayed on the user's profile page.

In some implementations, an information feed may be specific to a group of users of an online social network. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to an information feed for a particular user, group, object, or other construct within an online social network, an email notification or other type of network communication may be transmitted to all users following the user, group, or object in addition to the inclusion of the data as a feed item in one or more feeds, such as a user's profile feed, a news feed, or a record feed. In some online social networks, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different information feeds. A second user following a first user and a record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

FIG. 1 shows a system diagram of an example of a social networking environment 100 with communities according to some implementations. In FIG. 1, a social networking system 104 includes any number of computing devices such as servers 108a and 108b. The servers 108a and 108b are in communication with one or more storage mediums configured to store and maintain relevant data used to perform some of the techniques disclosed herein. In this example, the storage mediums include a user ID database 112 and a privileges database 116. The user ID database 112 can maintain lists of IDs of users who are members of respective communities. By way of example, a "Community 1 User IDs" table 120 in database 112 includes a list of IDs of users who are members of Community 1, a "Community 2 User IDs" table 124 lists IDs of users who are members of Community 2, and so forth.

In FIG. 1, the privileges database 116 is configured to store privilege information identifying or specifying access rights and restrictions of users according to various attributes such as a specified user ID, type of user, role of user, type of community to which the user belongs, and/or a particular organization on behalf of which a community is maintained. Such privilege information can be customized and edited as described in greater detail below.

In FIG. 1, the social networking system servers 108 are configured to maintain one or more communities of users such as communities 128, 132 and 136 by interacting with databases 112 and 116 to identify members of those communities and privileges of members of a given community. Any number of users such as users 140a, 140b and 140c can be serviced by social networking system 104. That is, any such users 140 can have user IDs and other relevant data such as user profiles maintained in social networking system 104. By leveraging the information stored in storage mediums such as user ID database 112 and privileges database 116, communities 128, 132 and 136 of such users 140 can be defined. Thus, in this example, the community 128 includes users 140a, community 132 includes users 140b, and community 136 includes users 140c and one of users 140b. Thus, one of the users 140b is a member of both communities 132 and 136. When any such users 140 log in directly to a community, bypassing login pages of social networking system 104, or log in via social networking system 104 using a suitable computing device such as a laptop, tablet or smartphone, such users can be allowed to access data and take one or more actions available through social networking system 104 as permitted by the relevant privilege information stored in privileges database 116.

In FIG. 1, each of the communities 128, 132 and 136 is operated on behalf of a different organization. In this example, community 128 is operated on behalf of Org A, which in this example is Acme, Inc. For example, the users 140*a* in community 128 may be employees, customers and/or partners of Acme, Inc. By the same token, the community 132 is operated on behalf of Org B, which can be any type of organization as described in greater detail below. The community 136 is maintained on behalf of Org C. The various users in a given community can have different relationships with the organization on behalf of which the community is maintained. Thus, one or more of the users 140*b* can be an employee, customer or business partner of Org B. In this example, as mentioned above, one of the users 140*b* is a member of both communities 132 and 136. Thus, this user 140*b* could be an employee of Org B and a customer of Org C by way of example.

In FIG. 1, each community 128, 132 and 136 often has one or more pages of relevant community data maintained by social networking system 104, where such pages are accessible by a web browser program operating on a user's computing device. Thus, any user having access to a given community as defined by data stored in privileges database 116 can load part or all of such pages for display on the user's computing device. In the example of FIG. 1, a community's page or pages is accessible at a web domain such as a URL including an org value identifying the specific organization on behalf of which the community is maintained. This org value can be a character such as a letter, number, symbol, or string of characters identifying the specific organization with which the community is affiliated. Thus, pages or other social network data available to users 140*a* in community 128 can be accessed at a URL such as acme.force.com/community-acme1/. In this example of a URL, the string "acme" of "acme.force.com" can provide the org value, which identifies Acme, Inc. by name. In some instances, the "acme" of "community-acme1" can provide the org value identifying Acme, Inc. Acme, Inc. can have other web pages available to the general public, for example, at the URL acme.com, which is a different root domain than the acme.force.com address at which community-specific pages are provided.

The page or pages maintained by the social networking system 104 for community 132 can be accessed at the URL orgb.force.com/community-orgb1/. As in the example of Acme, Inc., the "orgb" of "orgb.force.com" or the "orgb" of "community-orgb1" can be the org value identifying Org B. One or more pages maintained on behalf of community 136 can similarly be accessed and identified with org values at the URL orgc.force.com/communityorgc1/.

As described in the examples below, when a user 140*d* directly logs in to a community using an appropriate login page at the community URL, and the user is identified as a member of a particular community, the web browser program on the user's computing device can be automatically routed to access a page at the URL specific to that user's community, such as acme.force.com/community-acme1/. The user can choose to navigate through additional pages accessible via the community or communities to which the user belongs.

In addition, as explained in greater detail in the examples below, the network address at which a community's pages are accessible can include branding information identifying by a particular brand the community and/or the organization on behalf of which the community is maintained. Thus, in FIG. 1, in the example of community 128, the URL acme.force.com/community-acme1/includes the name "acme" twice, that is, at the root domain and as part of the subdomain identifying community 128. Such branding information can identify products and/or services provided by organization in some instances. Thus, a URL at which pages of community 128 are maintained can be customized to include names of brands recognizable to users having dealings with that organization, regardless of whether the users are employees, customers, partners or have other relationships with a particular organization.

Figure 2:
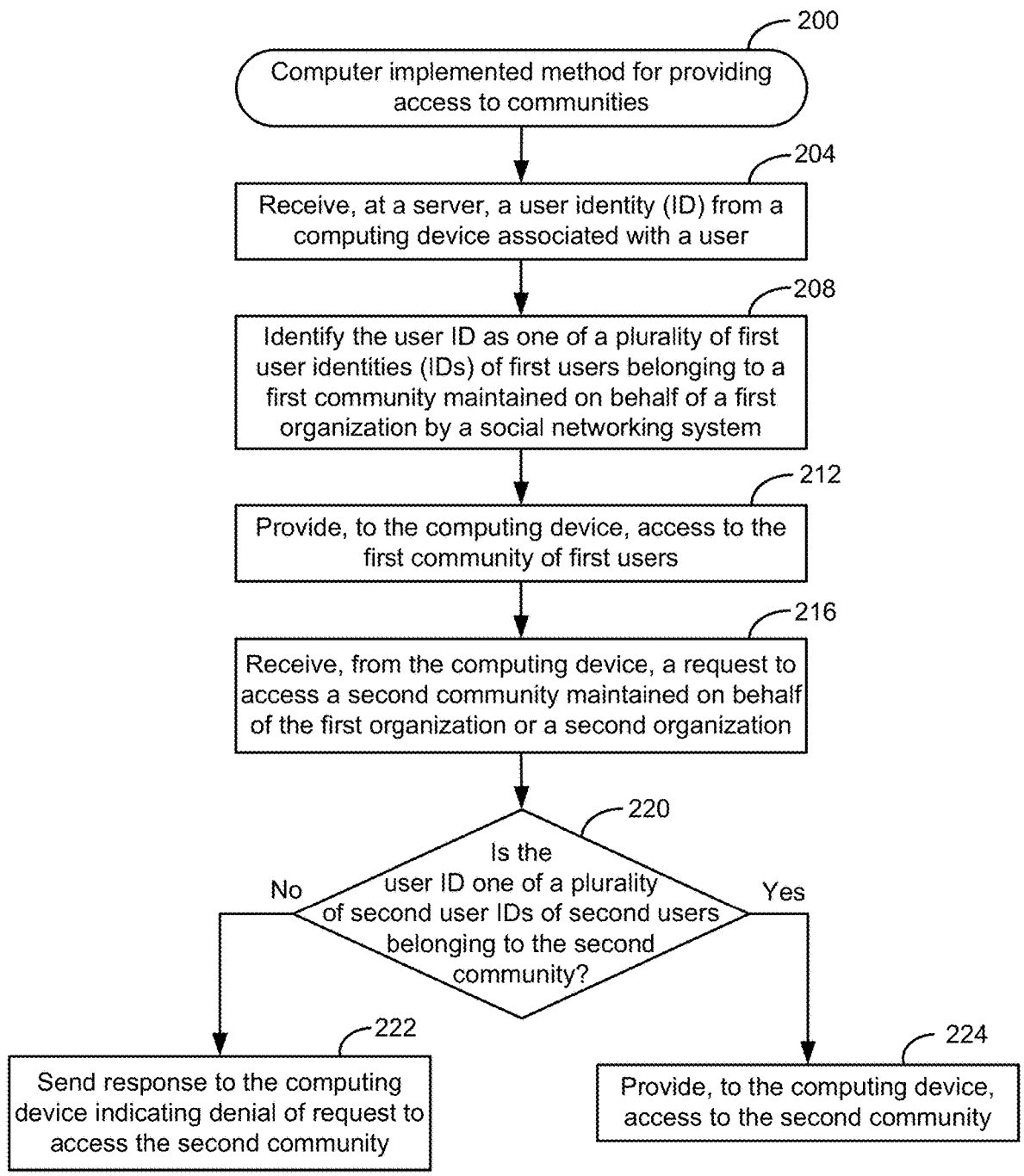
FIG. 2 shows a flowchart of an example of a computer implemented method 200 for providing access to communities of users in an online social network, performed in accordance with some implementations.

FIG. 2 shows a flowchart of an example of a computer implemented method 200 for providing access to communities in an online social network, performed in accordance with some implementations. In FIG. 2, at block 204, when a user 140*d* of FIG. 1 logs in to a community at the community URL, a computing device such as server 108*a* receives a user ID from a computing device 144 operated by user 140*d*. For example, user 140*d* can type his or her ID and password into an appropriate community login page displayed as a GUI on the display of device 144. At block 208, one of the servers 108 of social networking system 104 accesses user ID database 112 to identify the user ID received from computing device 144 in one or more lists of user IDs of various communities, such as tables 120 and 124.

Thus, at block 212, when the user ID received from user 140*d* is identified, for example, as one of the IDs of users belonging to a first community 128, access to community 128 is provided via computing device 144. The access provided at block 212 can be defined in terms of privileges to access designated data stored on behalf of community 128 and/or to take one or more actions permitted to members of the community 128, as defined by privilege information stored in privileges database 116. For example, when the user 140*d* is identified as an employee of Acme, Inc., privilege information stored in database 116 may indicate that user 140*d* is able to access user profiles of other members of community 128, access community-specific files such as .xls spreadsheets and .doc files, for instance, in the form of expense reimbursement requests and travel requests, as well as take actions such as posting messages on a community feed of community 128, posting messages on walls of users 140*a*, and following users 140*a* and records stored by social networking system 104 in association with community 128. That is, when the user 140*d* makes an appropriate request for such data or to take such action, for instance, through an appropriate GUI displayed on computing device 144, such a request is transmitted to a server 108 of social networking system 104, and the server 108 issues an appropriate response to computing device 144 acknowledging or denying the request in accordance with privilege information stored in database 116. Requested data, which the user has the right to access, can thus be transmitted back to computing device 144. For instance, profile data of one or more users 140*a* and/or community-specific file data can be transmitted from a server 108 to device 144 for viewing and further interaction by user 140*d*.

In FIG. 2, at block 216, during a browsing session, user 140*d* may submit a request via computing device 144 to access a second community maintained on behalf of the same organization, Acme, Inc., or on behalf of a different organization, such as Org B of FIG. 1. At block 220, similar to block 208 described above, a server 108 in social networking system 104 checks a list of user IDs of members of the second community to determine whether the same user ID received at block 204 from user 140*d* is included in the list. At block 222, when the ID of user 140*d* cannot be identified in the list of user IDs of users belonging to the second community, the server 108 sends a response to computing device 144 indicating that access to the second community has been denied. The content of such a response can be displayed in an appropriate GUI on the display of computing device 144.

Returning to block 220, when the user ID of user 140d is identified in the list of members of the second community, at block 224, a server or servers 108 in social networking system 104 provides access to the second community. As described above with reference to community 128 maintained on behalf of Acme, Inc., privilege information maintained in database 116 can be customized to define certain rights and restrictions of members of the second community to access social network data and initiate one or more actions, as described in greater detail below. For example, privilege information maintained in database 116 can identify user 140d as either an internal or external user of the organization on behalf of which the second community is maintained. Thus, appropriate access rights and restrictions can be assigned to internal or external users of the organization. For example, the user 140d may be an internal user of Org A and have a corresponding set of rights and restrictions with community 128, while the same user may be an external user of Org B and, thus, have a different set of rights and restrictions with community 132.

Figure 31A:
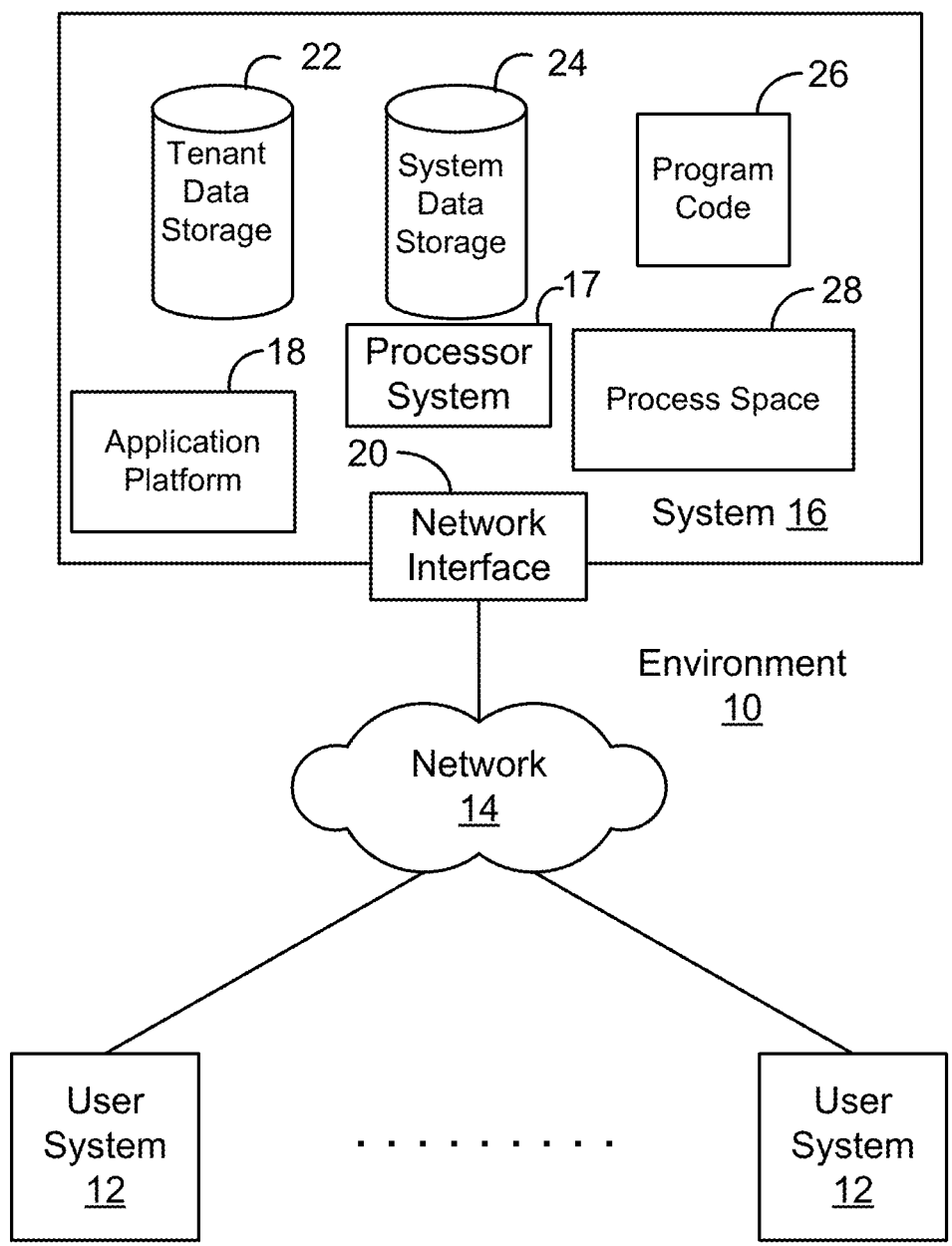
FIG. 31A shows a block diagram of an example of an environment 10 in which an on-demand database service can be used in accordance with some implementations.
Figure 31B:
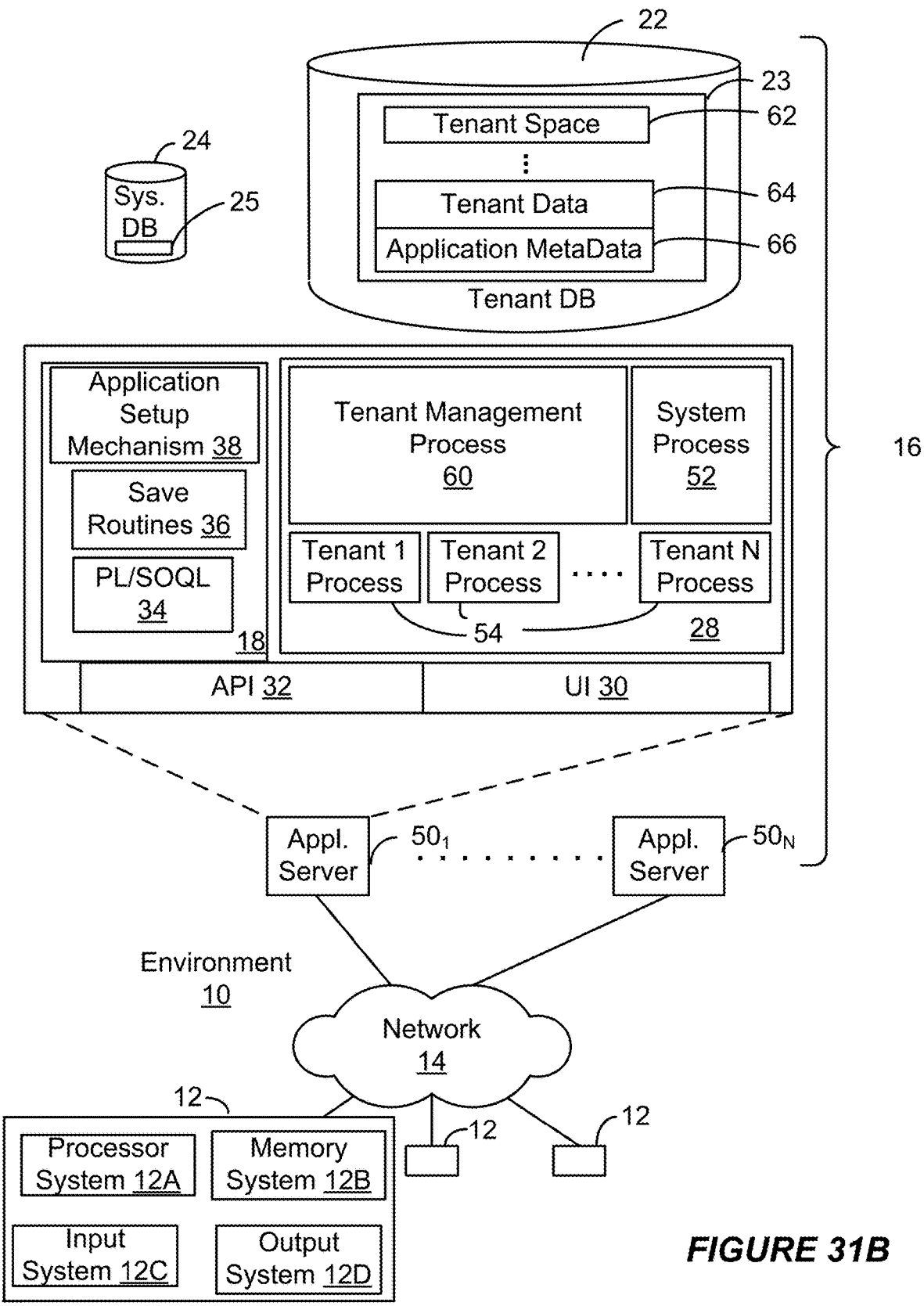
FIG. 31B shows a block diagram of an example of some implementations of elements of FIG. 31A and various possible interconnections between these elements.

In one example, an app server 3288 in the on-demand service environment 3200 of FIGS. 32A and 32B described below includes one or more processors configured to perform part or all of blocks 204-224 of FIG. 2. In other instances, one or more other computing devices of FIGS. 32A and 32B such as user systems 12 and/or other servers retrieve, process, and exchange data to cooperate with app server 3288 to perform the blocks. When user input data is submitted from a user, such data can be received by a server over a data network from a user operating a user system 12 as shown in FIGS. 31A and 31B described below. In other instances, such data is received from a proxy server on behalf of a user or other data source. Various implementations of method 200 of FIG. 2 are possible, such that any of the servers described below with reference to FIG. 32B or other computing devices disclosed herein can be configured to receive, process, and output data in accordance with method 200.

Figure 3:
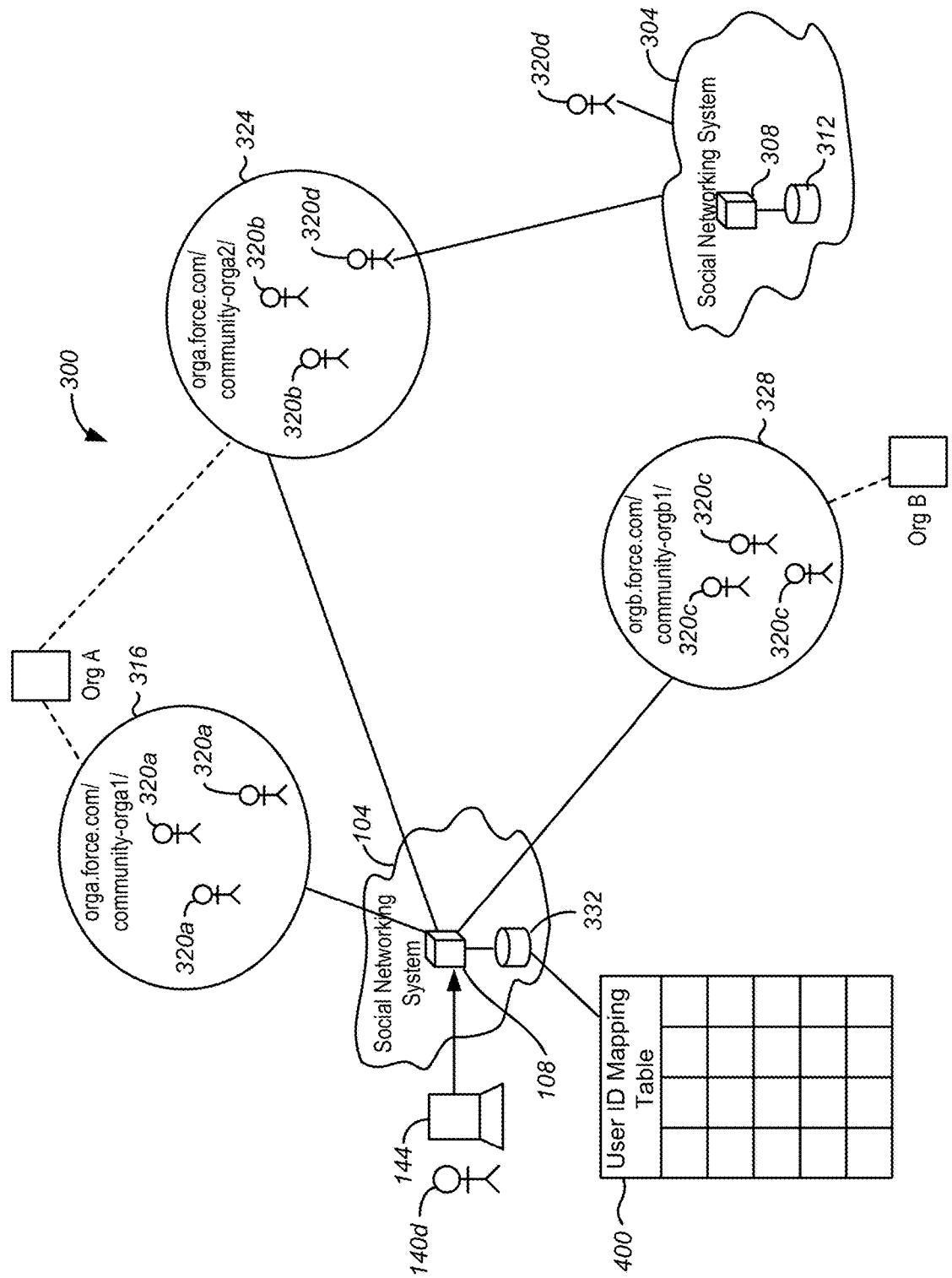
FIG. 3 shows a system diagram of an example of a social networking environment 300 with communities according to some implementations.

FIG. 3 shows a system diagram of an example of a social networking environment 300 with communities according to some implementations. While FIG. 1 shows a single social networking system 104 providing access to the various communities, the environment of FIG. 3 includes a second social networking system 304 in addition to social networking system 104 as generally described above. The social networking system 304 includes one or more servers 308 in communication with one or more storage mediums 312 configured to store user IDs, user profiles, and additional social network data appropriate for social networking system 304.

In the example of FIG. 3, social networking system 104 maintains a number of communities: community 316 of users 320a, community 324 of users 320b and a user 320d, and community 328 of users 320c. In this example, both communities 316 and 324 are maintained on behalf of the same organization, Org A. In this example, community 328 is maintained on behalf of Org B. In FIG. 3, social networking system 304 provides one or more social networking services to users having user accounts or profiles on system 304, including users 320d. In FIG. 3, a user ID database 332 of social networking system 104 maintains one or more user ID mapping tables 400 as an alternative or in addition to user ID tables 120 and 124 described above with reference to FIG. 1.

In FIG. 3, the user ID mapping table 400 can be used to identify one or more communities maintained by social networking system 104 of which a user 140d is a member. In addition, in the example of FIG. 3, the user ID mapping table 400 can be configured to identify any additional social networking systems such as system 304, at which user 140d may have a user ID. When a user 140d logs in to any community hosted at social networking system 104, the user ID mapping table 400 can be accessed to identify the user as a member of one or more other communities 316, 324 and 328 maintained by social networking system 104. Thus, the user can be automatically logged in, that is, without further input from the user, to the other communities of which the user is a member. In another example, the same user ID which a user submits to log in to his or her user account with an organization's intranet can be used to automatically log that user in to any communities maintained on behalf of the organization.

Figure 4:
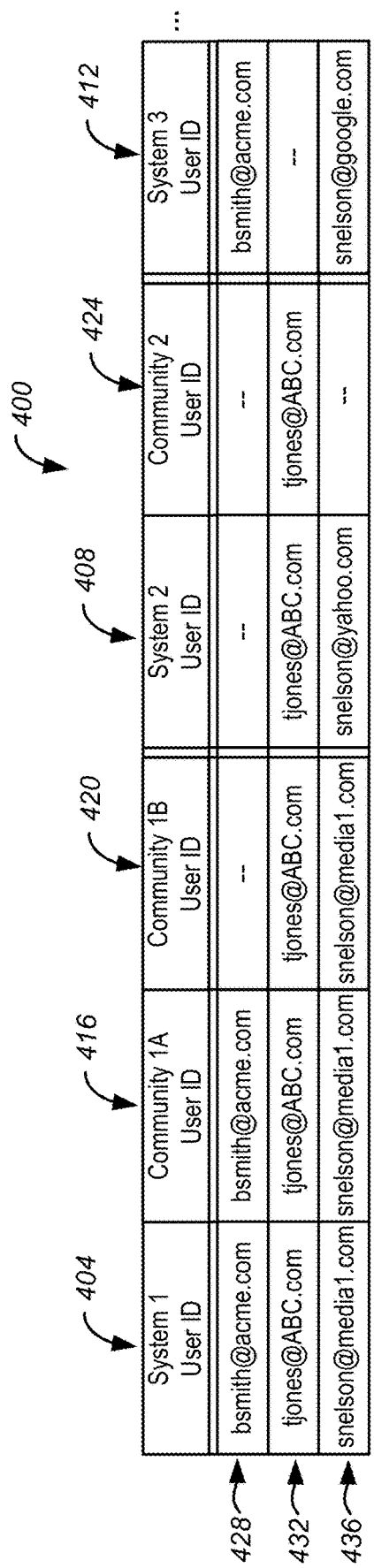
FIG. 4 shows an example of a user identity (ID) mapping table 400 identifying communities to which a user can be provided access, according to some implementations.

FIG. 4 shows an example of a user identity (ID) mapping table 400 identifying communities to which a user can be provided access, according to some implementations. In FIG. 4, the user ID mapping table 400 includes columns identifying any number of social networking systems and any communities maintained by such systems. In this example, table 400 identifies three respective social networking systems in columns 404, 408 and 412. Two communities identified in columns 416 and 420 are maintained by System 1, identified in column 404. Also, a community identified in column 424 is maintained by System 2 of column 408. In this example, System 3 identified in column 412 is a public system accessible by various users having accounts on such a system.

In FIG. 4, the user ID mapping table 400 can be configured to have rows identifying the user ID or IDs of a particular user used to gain access to any of the social networking systems and/or communities identified in the columns of table 400. A user can be able to log in to multiple different communities using the same single ID, for instance, in the form of a Chatter® user name, or in the form of an e-mail address used to access that user's account on LinkedIn® or Facebook®. In other instances, a particular user can have different IDs needed to log in or gain access to different communities and/or social networking systems. Thus, in this example, a user Bill Smith identified in row 428 has a user profile with System 1 and community 1A maintained by System 1. In this instance, the same e-mail address, bsmith@acme.com is stored in fields under columns 404 and 416. The same e-mail address, bsmith@acme.com, is used to access System 3 of column 412 as shown in row 428. Thus, in the case of Bill Smith, a single user ID in the form of Bill's e-mail address can provide access to various social networking systems and one or more communities maintained on behalf of such systems.

In FIG. 4, in row 432, a user, Tom Jones, has a first user profile with System 1 and a second user profile with System 2. In this instance, Tom Jones is also a member of communities 1A and 1B maintained by System 1 and community 2 maintained by System 2. As shown in row 432, the same e-mail address, tjones@ABC.com, is stored under the appropriate columns to identify Tom as a member of those social networking systems and communities. As shown in row 436, in some instances, it can be desirable to store different user IDs associated with the same user to allow that user to directly log in to different communities and/or social networking systems. In this example, Susan Nelson, a sales representative for Media One, Inc., has user profiles on Systems 1, 2 and 3 with different user IDs used to access each system. As indicated in row 436, one or more servers receiving one of Susan's IDs can use table 400 to log her in to System 1 using her e-mail address specific to System 1, in this case, snelson@media1.com.

Thus, returning to FIG. 3, when a user 140*d* provides a user ID to log in directly to a community hosted by social networking system 104 at the community URL, identification of the provided user ID in a row of user IDs in table 400 can allow one or more servers to retrieve other user IDs for the same user to automatically provide access to additional communities hosted at social networking system 104. Thus, for example, when a user logs in to a Burberry® community hosted at social networking system 104 of FIG. 3, that user can be automatically logged in to other communities 316, 324 and 328 using an appropriate mapping table such as table 400 of FIG. 4.

Returning to FIG. 1, various types of database tables can be structured to maintain appropriate privilege information in privileges database 116. FIG. 5 shows an example of a privileges table 500 identifying rights and restrictions of users to access data and initiate actions in one or more communities according to one or more attributes, according to some implementations. In FIG. 5, rights and restrictions can be defined and customized in terms of various attributes, including the identity of a particular organization on behalf of which a community is maintained, a particular community of which a user is a member, a type of user in the community, such as an internal user or an external user, as well as one or more roles a user in a community can have.

In FIG. 5, by way of illustration, privileges table 500 includes a privileges column 504 specifying whether a user's rights to access data and initiate actions are limited or unlimited according to various attributes as mentioned above. That is, the ability for a particular user to access and retrieve social network data and initiate various social networking actions can be defined as unlimited or limited in terms of one or more restrictions. Limited privileges with respect to social network data and/or actions can be defined on a per-attribute, per-user, per-data and/or per-action basis as described in greater detail below with reference to FIGS. 6 and 7. Examples of social network data with respect to which privileges can be uniquely defined and customized include particular names of records or types of records, particular user profiles or types of user profiles, particular statuses of user profiles, names of groups, particular types and statuses of groups, as well as CRM objects and various other constructs maintained by a social networking system. Examples of types of CRM objects include cases, accounts, opportunities, leads and contacts. Such CRM objects can be identified by name, type and/or status. Examples of particular social networking actions with respect to which a user can have unlimited or limited privileges include the ability to communicate with other users via one or more feeds, interact with particular records or types of records via one or more feeds, interact with one or more tasks, interact with one or more business processes, interact with CRM data, follow users, follow records, upload files, follow groups, join groups, create groups, follow organizations and create communities.

Returning to the example of FIG. 5, privileges can be defined and customized according to an attribute such as the identity of a particular organization and/or community with which a given user may be affiliated. For example, column 508 identifies communities A-1, A-2 and A-3, all of which are specific to Org A. With a particular community of a particular organization, as shown in column 512, a user's privileges with respect to data or actions can be categorized according to user type. For example, as shown in column 512, community 1 of Org A has both internal and external users, as shown in row 516. The "internal" or "external" type of a user can refer to the user's relationship with the community and/or organization identified in column 508. Thus, an internal user of community 1 of Org A may be an employee of Org A. In another example, different rights and restrictions are set up and maintained for internal and external users of community 1, regardless of which organization community 1 is affiliated with. As shown in row 520, some communities and Orgs have no specified user type or role, such as community 2 of Org A, which is a public community.

In FIG. 5, as shown in column 524, the privileges of a particular user can be further defined in terms of the user's role in a community and/or organization. Thus, in the example of row 516, employees of Org A have unlimited rights to access data and initiate actions in a social networking system in which community 1 is maintained. In the example of community 1 of Org A as shown in column 524 and row 516, other users having a customer or partner role, who are considered external users of Org A and community 1, also have unlimited rights to access and interact with data and initiate actions in social networking system 104, as shown in column 504. In this example, members of the public community 2 of Org A also have unlimited rights with respect to social network data and actions in the social networking system providing community 2, as shown in row 520 and column 504 of FIG. 5.

In another example, community 3 of Org A, as shown in row 528, has both internal and external users as shown in column 512. In community 3, internal users include both employees and partners of Org A. In community 3 of Org A, even though employees and partners are considered internal users of Org A, these different roles carry different privileges, as shown in fields 532 and 536. In field 532, employees have unlimited privileges with respect to social network data and actions. As shown in field 536, partners of community 3 of Org A have limited access to certain social network data and unlimited privileges to otherwise initiate actions in the social networking system providing community 3 on behalf of Org A. As described in greater detail below, when rights are restricted in some manner, that is, when privileges are limited as in the case of a partner's rights with respect to social network data in community 3 of Org A, an access model can be set up and customized to specify particular and restrictions for accessing and interacting with such data. Access models are described in greater detail in the examples below. Returning to FIG. 5, customers, who are considered external users of community 3 of Org A, as shown in row 528, have restrictions on their rights to access certain social network data and on their rights to initiate one or more actions, as defined in an appropriate access model, as show in field 540.

FIG. 6 shows an example of a privileges table 600 identifying different access models governing permissions of users to access data and initiate actions in one or more communities according to one or more attributes, according to some implementations. As shown in table 600, in some implementations, access models identified in column 604 can be differentiated from each other according to one or more attributes as described above with respect to FIG. 5 in addition to other attributes. In this example, various access models are configured according to the type of community such as private or public in column 632, the particular organization with which a community is affiliated in column 636, a user type in column 640, and a user role in column 644.

In FIG. 6, a community column 608 identifies any number of communities accessible through a social networking system. In this example, community column 608 identifies five communities in rows 612-628. In this example, communities A-1 and A-2 are both affiliated with Org A, community 2 is specific to Org C, community 3 is specific to Org B, and community 4 is specific to Org D. In the case of communities A-2 and 2, a user type and a user role in columns 640 and 644 are not specified. This is because communities A-2 and 2 are public communities, where users have the same rights and restrictions regardless of their type or role.

In FIG. 6, as shown in row 624, an access model in column 604 can be specific to community 3, which is a private community maintained on behalf of organization B, and where the rights and restrictions of the access model are specific to customers, who are external users of community 3. By the same token, as shown in row 628, a different access model can be assigned to partners of private community 4, where such partners are internal users of Org D. The table 600 of FIG. 6 is intended to show non-limiting examples of the different access models, which can be defined and customized according to the various attributes identified in columns 608, 632, 636, 640 and 644. Those skilled in the art will appreciate that various additional access models can be configured and maintained in additional rows of table 600, which provides a non-exhaustive listing of access models in column 604.

Figure 7:
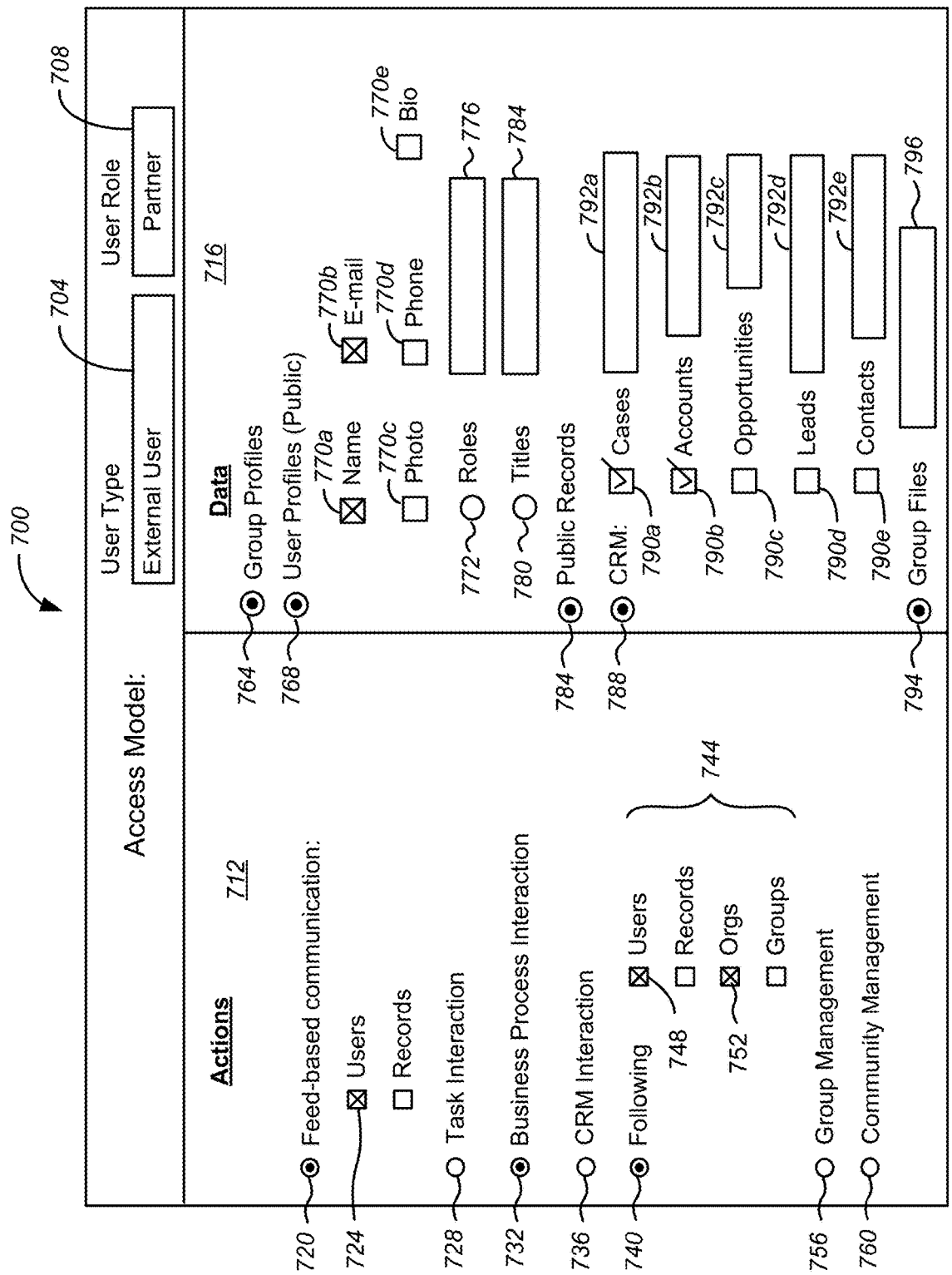
FIG. 7 shows an example of an access model customization window 700 as displayed in a graphical user interface (GUI) on a display device, according to some implementations.

FIG. 7 shows an example of an access model customization window 700 as displayed in a graphical user interface (GUI) on a display device, according to some implementations. In FIG. 7, the access model window 700 allows a system administrator or authorized community member to customize the rights and restrictions a user has to initiate actions and retrieve social network data in one or more communities as mentioned above. In this example, a specific type of user can be specified in field 704, and a particular role of the user can be specified in field 708. Thus, customized selections described below can be stored on a suitable storage medium, for instance, in privileges database 116 of FIG. 1, to maintain customized rights and restrictions for particular user types and roles in a given community and/or organization.

In this example, access model window 700 includes an actions pane 712 with a list of actions available to external users who are partners, as indicated in fields 704 and 708. A data pane 716 identifies particular types of social network data, to which external users who are partners of a given community and/or organization can be granted access. In this example, "feed-based communication" selection 720 has been selected along with "users" sub-selection 724 to allow partners to communicate with other users using one or more feeds available to members of a given community. For example, clicking on selection 720 and sub-selection 724 allows a partner to post and comment on posts in a community feed. Selection 728, "task interaction", allows one to determine whether partners will be allowed to interact with tasks otherwise accessible and viewable in a particular community. In this example, selection 728 has not been checked, thus preventing partners from interacting with such tasks. A "business process interaction" selection 732 has been activated, allowing partners to view and interact with business processes otherwise available to members of a given community. A "CRM Interaction" selection 736 has not been activated, thus preventing partners from interacting with CRM objects stored in the social networking system hosting the community. A "following" selection 740 allows a system administrator to grant rights to partners allowing them to follow one or more entities 744, such as users, records, organizations and groups. In this example, only the "users" and "orgs" sub-selections 748 and 752 have been selected, thus allowing partners to follow users and organizations but preventing partners from following records and groups. A "group management" selection 756 and a "community management" selection 760 can be selected to allow a particular user, a partner in this example, to have the right to create, manage and delete groups and communities. In this example, selections 756 and 760 have not been checked, thus preventing partners from having such privileges.

In FIG. 7, in data pane 716, a system administrator or other user can select particular data objects and types of objects to which a particular user, a partner in this example, can have read and/or write privileges in a community. In this example, "group profiles" selection 764 and "user profiles" selection 768 have been checked, thus allowing partners to view profiles of groups and users who have allowed their profiles to be publicly viewable. In this example, write privileges for such data are not available to anyone outside of a group leader or user owning the profile. Sub-selections 770a-770d can be selected to specify particular types of profile information to which a partner can have access. In this example, sub-selections 770a and 770b have been checked, allowing one to access a name and e-mail address of a public user profile, while selections 770c-770e have not been checked, thus preventing partners from accessing photos, phone numbers and biographical information of a user profile. In other sub-selections of user profiles, a roles selection 772 includes a data entry field 776 allowing a system administrator to specify one or more roles of users having profiles, which a partner can be granted access to view. Titles selection 780 similarly provides a data entry field 784 to specify titles of users having public profiles that a partner can be granted access to view.

In FIG. 7, selection 784 specifies whether a partner will have access to public records otherwise accessible through a given community. A "CRM" selection 788 includes sub-selections 790a-790e allowing a system administrator to specify in data entry fields 792a-792e the names of cases, accounts, opportunities, leads and/or contacts to which a partner shall have access. In this example, sub-selections 790a and 790b have been checked, with no names of cases or accounts specified in fields 792a and 792b. Thus, a partner will have general access to cases and accounts accessible to members of the particular community. By the same token, sub-selections 790c-790e have not been checked, thus preventing partners from viewing or otherwise interacting with opportunities, leads and contacts. Selection 794 can be checked to grant access to files of a particular group named in data entry field 796. In this example, this "group files" selection 794 has not been checked, thus preventing partners from accessing any such files stored or accessible to members of a particular group.

In FIG. 7, returning to user profiles selection 768 and sub-selections 770a-770e, a level of visibility of user profiles can be defined for partners of a community in terms of which types of information in users' profiles can be viewed. For example, it may be desirable in some instances that partners be able to access names and phone numbers, while in other instances, partners should be restricted from viewing any contact information other than the user's name.

As mentioned above, communities can be accessed at custom domains, which may include the name and/or brand of an organization with which the community is affiliated. In some instances, an organization actively managing or otherwise providing input to community pages may customize the particular domain name appropriately. Thus, in the example of FIG. 1, representatives of Acme, Inc. have customized the URL of community 128 to be acme.force.com/community-acme1/. In the example of FIG. 3, where communities 316 and 324 are both affiliated with Org A, community 316 can be accessed at the URL orga.force.com/community-orga1/, while community 324 can be accessed at the URL orga.force.com/community-orga2/. In FIG. 3, community 328 can have a URL customized by representatives of Org B as desired, for instance, to include a brand name of a product or service provided by Org B.

In FIGS. 1 and 3, when a user 140*d* is using an appropriate computing device 144 with a web browser program to navigate among the various available communities, some of the disclosed implementations provide for navigation from one community to another for the same and different organizations as a seamless experience for the user. Applying some of the disclosed techniques, cookies and web browsing sessions can be created and managed in a transparent and secure manner.

As described in greater detail below, in some implementations, during a browsing session, a user's computing device can be directed or redirected to appropriate login pages at selected times when appropriate for security purposes. For instance, a user 140*d* through the user's computing device 144 may request access to a community, which the user has not logged in to. In one example, in FIG. 3, a user may have logged in to community 324 but not community 328. In such cases, when the user attempts to click through a page provided at orga.force.com/community-orga2/ that links to data maintained at community 328, that is at the URL orgb.force.com/community-orgb1/, security mechanisms can be implemented to ensure that the requesting user should be granted access to such data at community 328. In this and other various examples, the disclosed techniques provide for establishing, managing and checking browsing sessions between a user and one or more communities at appropriate times and, when desired for security purposes, prompting a user to enter credentials in the form of a user ID and/or password. In this way, using appropriate GUIs, users can select and retrieve data resources available through communities to which the user belongs and navigate with security mechanisms being triggered at appropriate times to confirm that the user should be granted access to such data.

Figure 8:
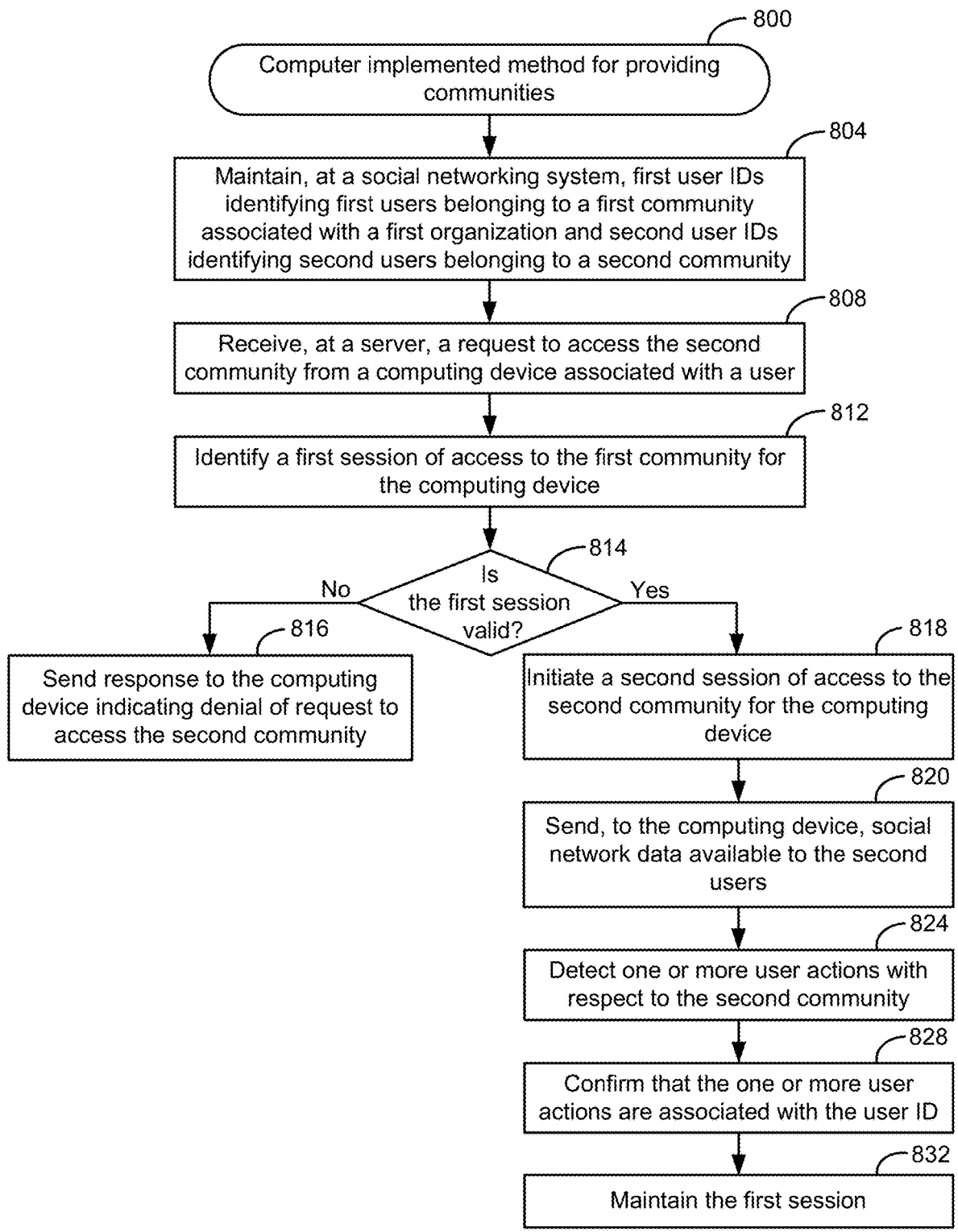
FIG. 8 shows a flowchart of an example of a computer implemented method 800 for providing communities in an online social network, performed in accordance with some implementations.

FIG. 8 shows a flowchart of an example of a computer implemented method 800 for providing communities in an online social network, performed in accordance with some implementations. In FIG. 8, at block 804, one or more database tables with user IDs identifying users belonging to particular communities can be maintained, such as tables 120 and 124 stored in user ID database 112 of FIG. 1 and user ID mapping table 400 stored in user ID database 332 of FIG. 3.

In the example of FIG. 8, a user such as user 140*d* of FIG. 3 has already established a browsing session with community 316, for instance, by logging into that community via one or more login pages provided to the user's computing device, for instance, at the orga.force.com/community-orga1/ sub-domain. In this example, after establishing this first session with community 316, thus providing computing device 144 with at least partial access to social network data accessible at community 316, at block 808, a server 108 in social networking system 104 receives a request from computing device 144 to access another community such as community 324, also operated on behalf of Org A. In response to receiving such a request, at block 812, a server 108 in social networking system 104 identifies the first session, for instance, by reading a cookie identifying the first session that was delivered to user 140*d*'s computing device 144 when the first session with the community 316 was established.

In FIG. 8, at block 814, after the first session has been identified, at block 814, a server 108 in social networking system 104 is configured to determine whether the first session is still valid. One or more processing operations can be performed at block 814 to check for one or a combination of conditions indicating that the first session is valid, as described in greater detail below with reference to FIGS. 9 and 10. At block 816, if the session with community 316 has timed out or is otherwise invalid, the request to access the second community is denied, for example, by delivering an appropriate response to computing device 144.

Returning to block 814, when the first is determined to be valid, at block 818, the request can be granted; that is, a second browsing session between computing device 144 and community 324 can be initiated. One or more databases at social networking system 104 can be configured to store and maintain identifications of sessions between a given user's computing device and any number of communities accessible via social networking system 104. In some instances, as additional sessions are initiated for a user's computing device after determining that one or more valid sessions exist between that user's computing device and other communities, the identifications of the additional sessions can be linked, for example, in a parent-child hierarchy. For example, one session can be identified as a parent or child of another session determined to be valid at block 814. The parent-child hierarchy represents one of various examples for identifying and managing concurrent sessions that a user may establish with various communities accessible through a social networking system. In other examples, a database table similar to user ID mapping table 400 of FIG. 4 can be maintained, with fields under the respective system and community columns 404-420 indicating whether a session is active.

In FIG. 8, at block 820, since a session with community 324 has been established, social network data accessible through community 324 can be delivered to the user's computing device 144 upon request, that is, after determining that the user 140*d* has the appropriate privileges to access such data, as indicated by an access model or other definition of user rights and restrictions for community 324 as described above.

In some instances, it can be desirable to maintain one or more browsing sessions in response to user activity with respect to a given community. That is, as time passes and there is inaction on the part of a user 140*d* in any of the various communities with which the user has established a browsing session, activity on one of the communities can refresh sessions in the other communities. Thus, at block 824, by way of example, when a user takes an action such as following another user or subscribing to a record of community 324, such an action can be detected. After confirming at block 828 that such user action is requested by user 140*d*, for example, by checking one or more cookies stored at computing device 144, at block 832, sessions with other communities such as community 316 can be maintained. For instance, when a timeout condition is implemented at community 316, activity in community 324 can cause the clock on which the timeout condition is based to be reset.

Figure 9:
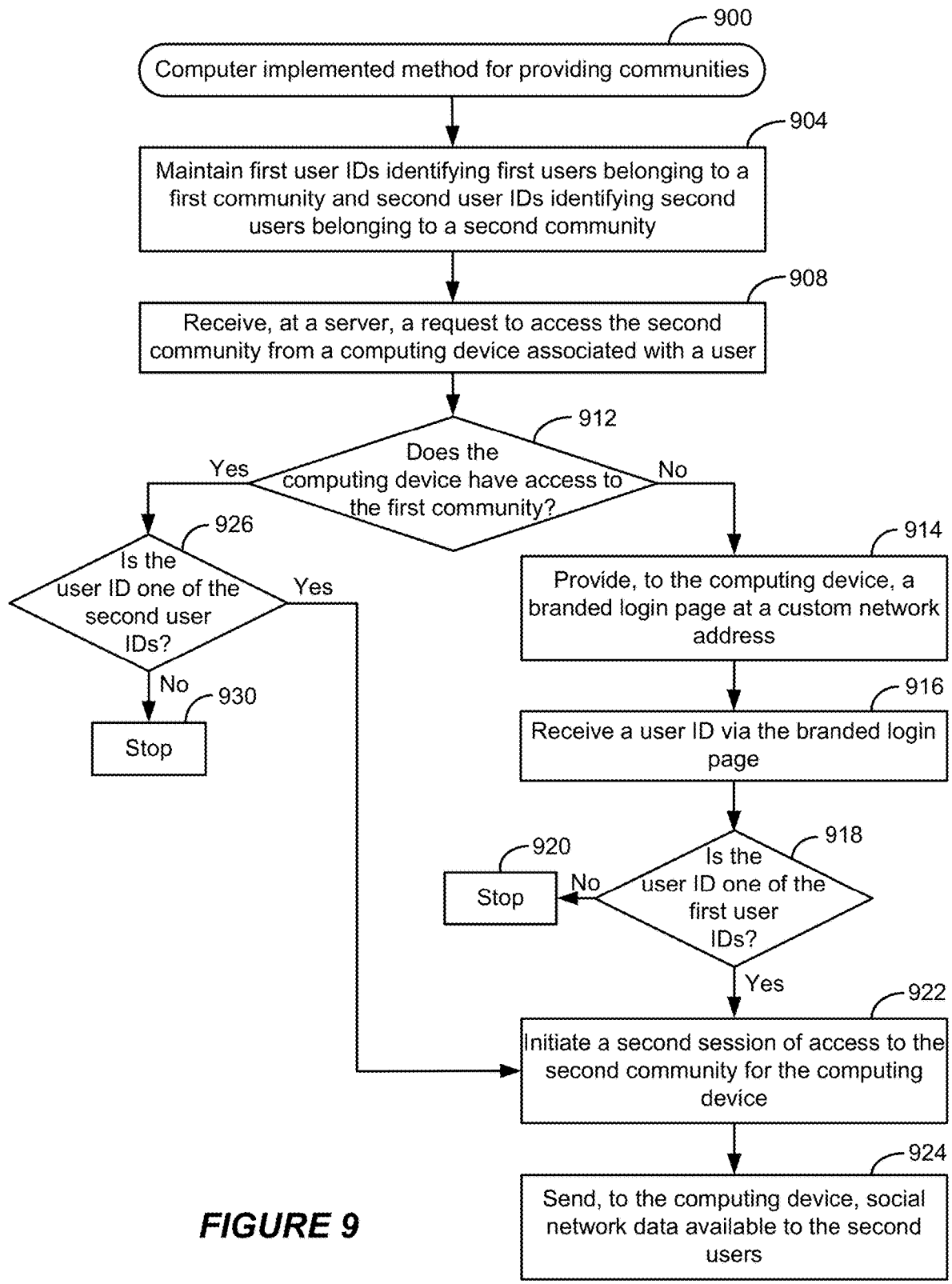
FIG. 9 shows a flowchart of an example of a computer implemented method 900 for providing communities in an online social network, performed in accordance with some implementations.

FIG. 9 shows a flowchart of an example of a computer implemented method 900 for providing communities in an online social network, performed in accordance with some implementations. In FIG. 9, at block 904, one or more database tables are maintained to identify users who are members of various communities as generally described above at block 804 of FIG. 8. In this example, the lists of user IDs identify communities associated with different organizations. Thus, for example, as described above with reference to FIG. 3, a user ID mapping table 400 can identify communities 324, 328 and 336 in addition to community 316.

At block 908, a server 108 in social networking system 104 receives a request to access community 324, 328 or 336 from computing device 144 operated by user 140d. For example, a user browsing a feed provided by community 316 may see a feed item including a link to a file stored for members of community 324 or 328. In another example, a user browsing such a feed in community 316 may wish to view a user profile of a user who submitted a post to the feed of community 316. The request of block 908 can be in the form of a mouse click or other selection made in a GUI to access data of another community or take some other action with respect to the other community.

At block 912, in response to receiving such a request at block 908, a server in social networking system 104 is configured to determine whether the user's computing device 144 has access to another one of the communities. One or more conditions can be checked to make this determination at block 912. For example, a server 108 can check whether a browsing session exists between the user's computing device 144 and community 316. If such a session exists, the server can attempt to authenticate that session, for example, using a session cookie previously stored at the user's computing device 144 when the session with community 316 was established.

In some implementations, users can log in to multiple communities affiliated with the same organization as desired to establish respective sessions between the user's computing device and those communities. In some instances, a cookie is issued for the root domain of the organization, regardless of how many communities affiliated with that organization that the user has established sessions with. That is, in some instances, multiple sessions with different communities affiliated with the same organization can be identified by a single root domain cookie identifying the organization. Thus, in the example of FIG. 3, Org A has at least two communities, community 316 and community 324. While user 140d can establish a separate session with each community 316 and 324, in some implementations a cookie is only issued identifying the root domain, orga.force.com, which is applicable to both communities 316 and 324. Thus, in the example where a user has a session established with community 316 and is requesting access to community 324, a server 108 of social networking system 104 checks whether a cookie identifying orga.force.com has been issued to the user's computing device 144. If the cookie indicates that the session with community 316 is valid, method 900 can proceed to check other conditions, at block 926, such as whether the user is identified in a table of user ID database 332 as a member of the community to which the user has requested access, in this case community 324. When such additional condition(s) is satisfied, method 900 can proceed to block 922 described below. At block 926, when the requesting user is not identified as a member of community 324, the user is denied access, for instance, by a server 108 sending an appropriate message for display in a GUI on the user's computing device 144.

Thus, for example, returning to block 912, when an external user has already logged in to community 316 and attempts to access a resource at community 324, session management code can be executed at a server 108 to identify a valid session with any community at the shared root domain of Org A, orga.force.com, as indicated by a cookie on the user's computing device 144. When a valid session with orga.force.com is identified, at block 926, the server confirms that the user has rights to access the requested resource at community 324 by confirming that the requesting user is a member of community 324.

Returning to block 912, when it is determined that computing device 144 does not have access to community 316, a server 108 can provide the user with an opportunity to log in to community 316. Thus, the server can provide a branded login page at a custom network address to be loaded by the browser program operating on computing device 144, at block 914. The branded login page can include branding information identifying community 316 and a prompt for a user ID and password to gain access to community 316. For instance, the login page provided at block 914 can include product or service names of organization A and community 316. The login page at block 914 can be served from an appropriate custom URL such as the orga.force.com/community-orga1/ sub-domain. Such a login page can serve as an entry point to community 316 for both internal and external users, as described in greater detail in the examples below.

In FIG. 9, at block 916, the user ID to access community 316 is received from computing device 144. At block 918, a server 108 at social networking system 104 determines whether the received user ID is one of a list of user IDs of members of community 316. If the user ID is not identified at block 918, processing can be terminated at block 920. Returning to block 918, if the user ID received at block 916 identifies a member of community 316, at block 922, a browsing session providing access to the requested community 324 is established for computing device 144. Thus, at block 924, when a user 140d requests social network data and/or actions available to members of community 324, appropriate data can be transmitted from a server 108 in social networking system 104 to computing device 144.

While the examples described above in relation to FIG. 9 are in terms of different communities maintained on behalf of the same organization, the same techniques can be applied to initiate, maintain and check the validity of browsing sessions established between a user's computing device 144 and various communities accessible through a social networking system 104, including communities maintained on behalf of other organizations. Database tables identifying and storing multiple sessions at a given time between the user's computing device 144 and the various communities, for instance, as identified in FIG. 3, can be provided in a storage medium of social networking system 104. Thus, one or more servers in a given social networking system 104 can identify and manage user browsing sessions with communities maintained on behalf of various organizations by expanding the number of cookies issued to a computing device to identify such sessions. In situations where multiple organizations and communities of such organizations are provided, separate cookies can be issued to identify individual sessions with particular communities or identify groups of sessions according to the organization on behalf of which the communities are maintained.

Figure 10:
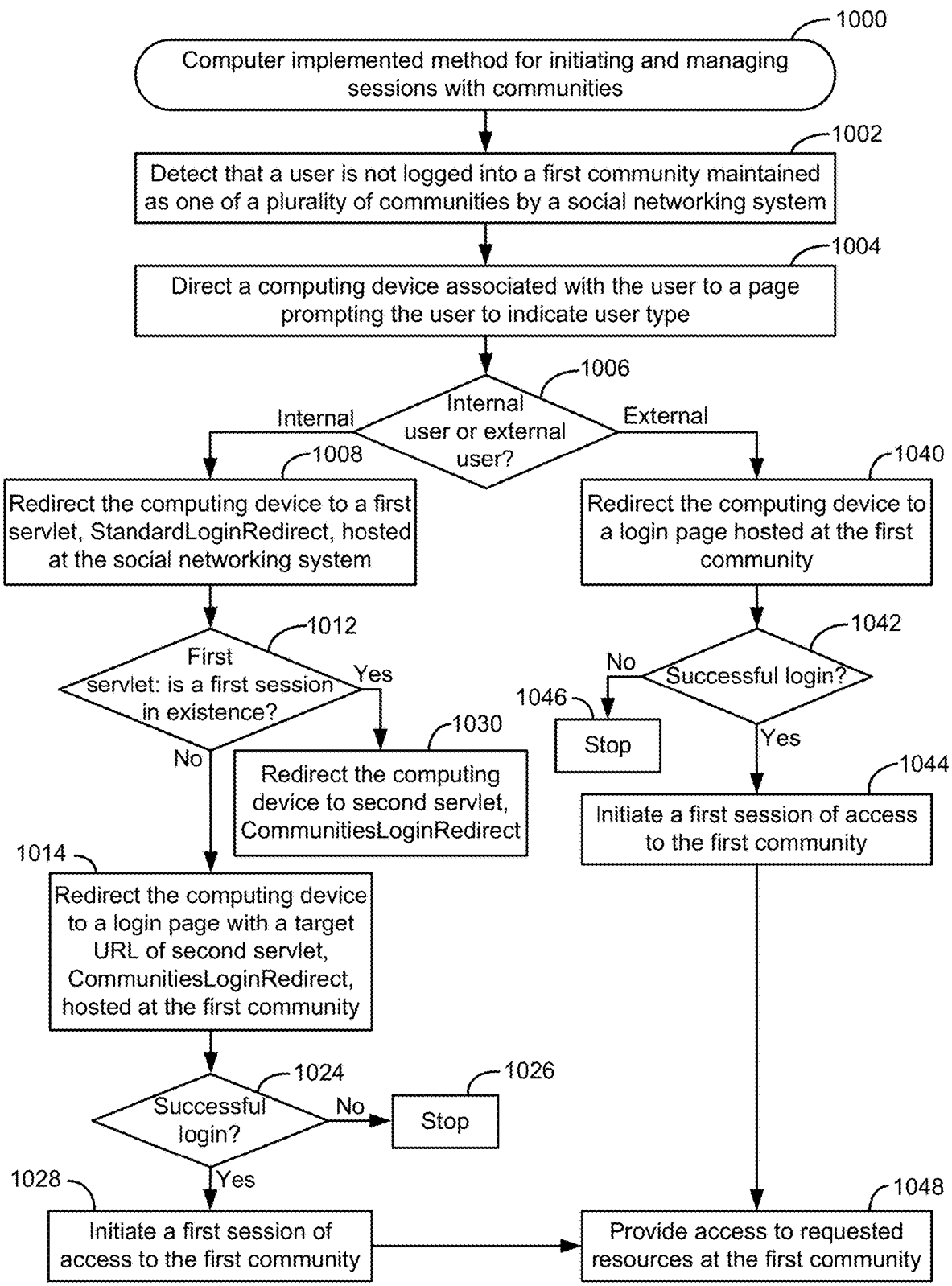
FIG. 10 shows a flowchart of an example of a computer implemented method 1000 for initiating and managing sessions with communities in an online social network, performed in accordance with some implementations.

FIG. 10 shows a flowchart of an example of a computer implemented method 1000 for initiating and managing sessions with communities in an online social network, performed in accordance with some implementations. In FIG. 10, at block 1002, a server 108 in social networking system 104 of FIG. 3 is configured to detect that a user is not logged in to a first community, for example, when the user's computing device 144 has submitted a request to access the first community or a second community accessible through social networking system 104. At block 1004, a user not being logged in to a particular community is one example of a situation in which a session has not been established or has timed out between the user's computing device and that community. At block 1004, in response to the user's request to access a community, the browser program on the user's computing device 144 is redirected to a page prompting the user to indicate his or her type. For example, as mentioned above, a user's rights and restrictions to access certain data and/or initiate certain actions in a given community can depend on whether the user is an internal or external user of a given organization and/or community. Thus, returning to block 1002, when the user has requested access to a record or other object stored, for example, at community 324, the rights and restrictions of the user to access such data may depend on whether the user is of the internal or external type. Thus, at block 1004, the user's browser is redirected to a page prompting the user to declare what kind of user he or she is. For example, the page provided at block 1004 can prompt the user to click one of two options, "internal" or "external". In this way, the browser on computing device 144 can be directed to an appropriate flow.

At block 1006, it is determined whether the user has indicated that he or she is an internal user or external user. In the example of FIG. 10, such types of users are handled in different manners. For example, external users can be provided with sessions and cookies identifying only a particular organization's root domain, such as orga.force.com. In this example, internal users will have separate sessions and cookies established at both the root domain of orga.force.com and a domain operated by social networking system 104 apart from the various communities, such as na1.salesforce.com, when the social networking system 104 is Chatter®, by way of example only.

In some implementations, to enable internal users to navigate between the social networking system domain and the root domain of the organization, servlets are provided to bridge the sessions with each domain. For example, a "CommunitiesLoginRedirect" servlet can be hosted at the root domain of Org A, that is, orga.force.com. Another servlet, "StandardLoginRedirect", can be hosted at one or more servers of social networking system 104. These servlets can be configured to detect sessions that may have been established between a user's computing device 144 and social networking system 104 and/or between computing device 144 and one or more communities. In addition, these servlets can cooperate with each other to initiate child or parent sessions as desired with respect to existing sessions. In addition, the servlets can be configured to pass session IDs identifying specific sessions.

At block 1006, when the user is identified as an internal user, the browser program operating on computing device 144 is redirected to the StandardLoginRedirect servlet running at social networking system 104. In this example, at block 1012, the StandardLoginRedirect servlet detects whether a session between the internal user's computing device 144 and social networking system 104 exists. At block 1014, if such a session does not exist, the browser program operating on computing device 144 is redirected to a social networking system login page, such as login.salesforce.com, with a target URL of the servlet CommunitiesLoginRedirect hosted at orga.force.com. At block 1014, the login page displayed as a GUI on computing device 144 prompts the user for credentials such as a user ID and password to gain access to social networking system 104.

Following block 1014, if the login is successful at block 1024, the entered user ID and password confirm that the user has a profile or user account with social networking system 104. Thus, the method proceeds to block 1028 at which a session of access with a first community, such as community 324, is created by the CommunitiesLoginRedirect servlet and identified as a child or parent with respect to the session the user established with social networking system 104 by providing the appropriate credentials at the login.salesforce.com page. For instance, a session cookie can be issued to computing device 144 at this point to identify this session with community 324. Returning to block 1024, processing can be halted at block 1026 if the login is unsuccessful.

In FIG. 10, returning to block 1012, when a session with the social networking system 104 is determined to be in existence, a server 108 in social networking system 104 redirects the browser program operating on computing device 144 to the CommunitiesLoginRedirect servlet, which is configured to create a new session and issue one or more cookies at block 1030.

Returning to block 1006, when the user is identified as an external user, at block 1040, the user's browser program is directed to a community login page at orga.force.com/community-orga2/ of community 324 to prompt the user for credentials such as a user ID and password. At block 1042, if the login is unsuccessful, processing can be terminated at block 1046. At block 1042, if the login is successful, login code executed at one or more servers of social networking system 104 is configured to detect the user ID received at block 1040 as being included in one of the tables maintained at user ID database 332 and thus create a session between the user's computing device 144 and the root domain, orga.force.com, or the specific community, in this case, orga.force.com/community-orga2. At block 1048, after an appropriate session is established between the user's computing device 144 and community 316, the browser program operating on computing device 144 can be redirected to the requested resource stored at the orga.force.com/community-orga2/ sub-domain. Thus, external users can access resources stored at orga.force.com/community-orga2/ without having to go through a generic login process for logging in to the social networking system 104.

FIGS. 11-30 show examples of pages in the form of GUIs as displayed on display devices for interacting with communities in an online social network, according to some implementations. In one example of a use case, a user, Eddie, is a customer of Charles, an organization providing investment services. Returning to FIG. 3, Eddie uses his computing device 144 to navigate to a public website operated by or on behalf of Charles, such as charles.com. Eddie is browsing the Charles website to search for information on international tax implications when investing for retirement. In this example, Eddie is having difficulty identifying any useful information on the public Charles website. Thus, Eddie decides to log in to a Charles customer community 316 maintained by a social networking system 104 on behalf of Charles.

Figure 11:
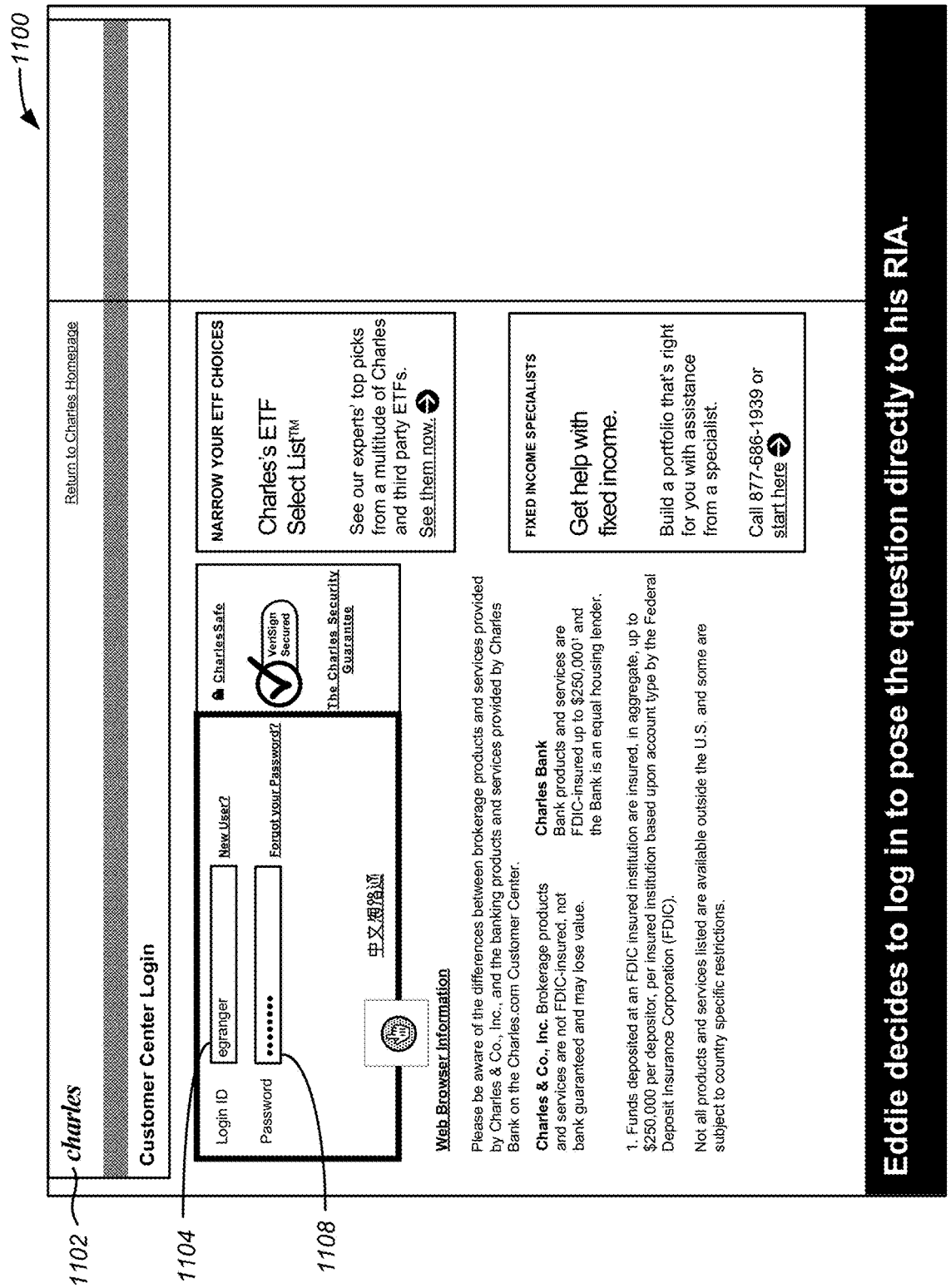
Figure 12:
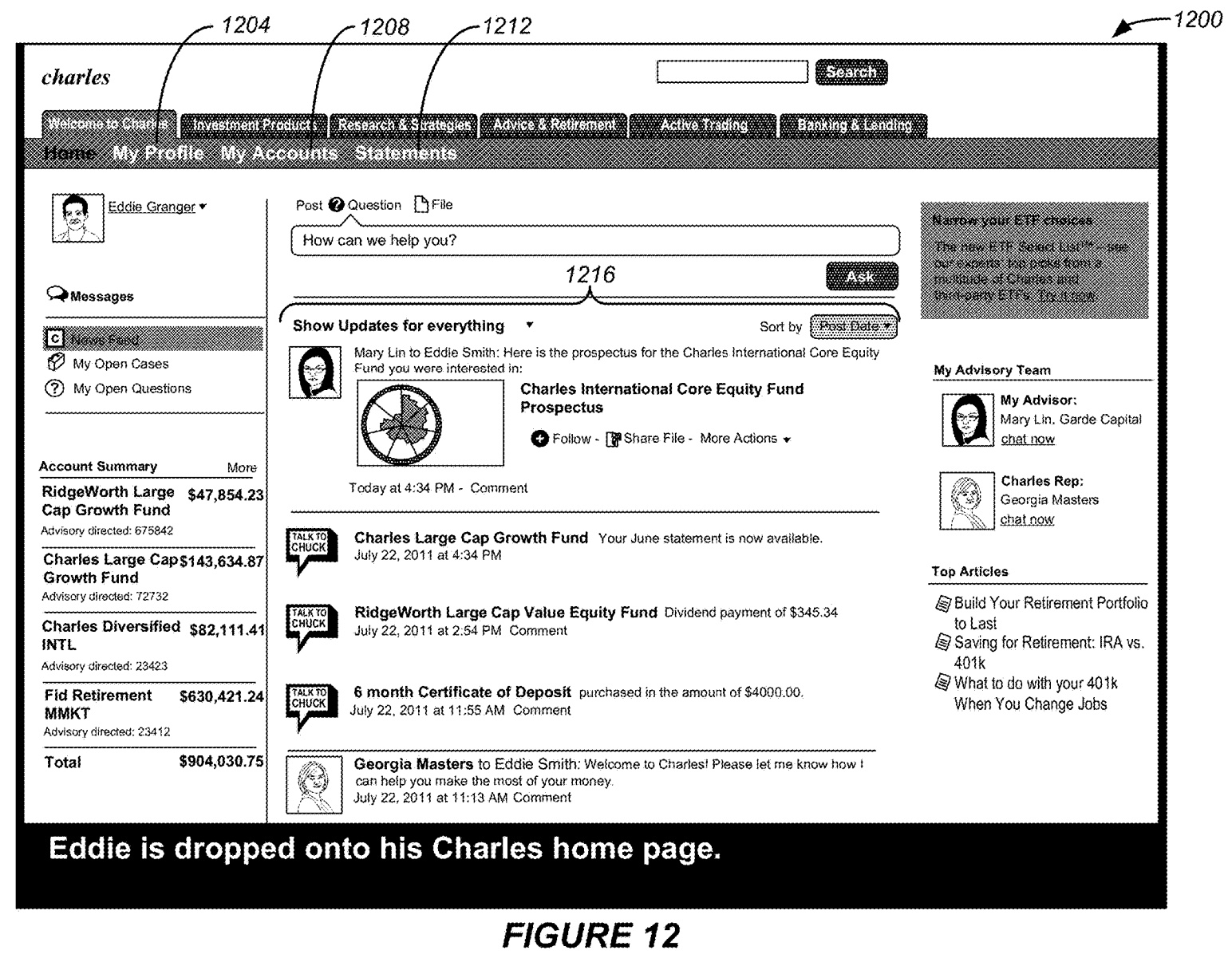
Figure 13:
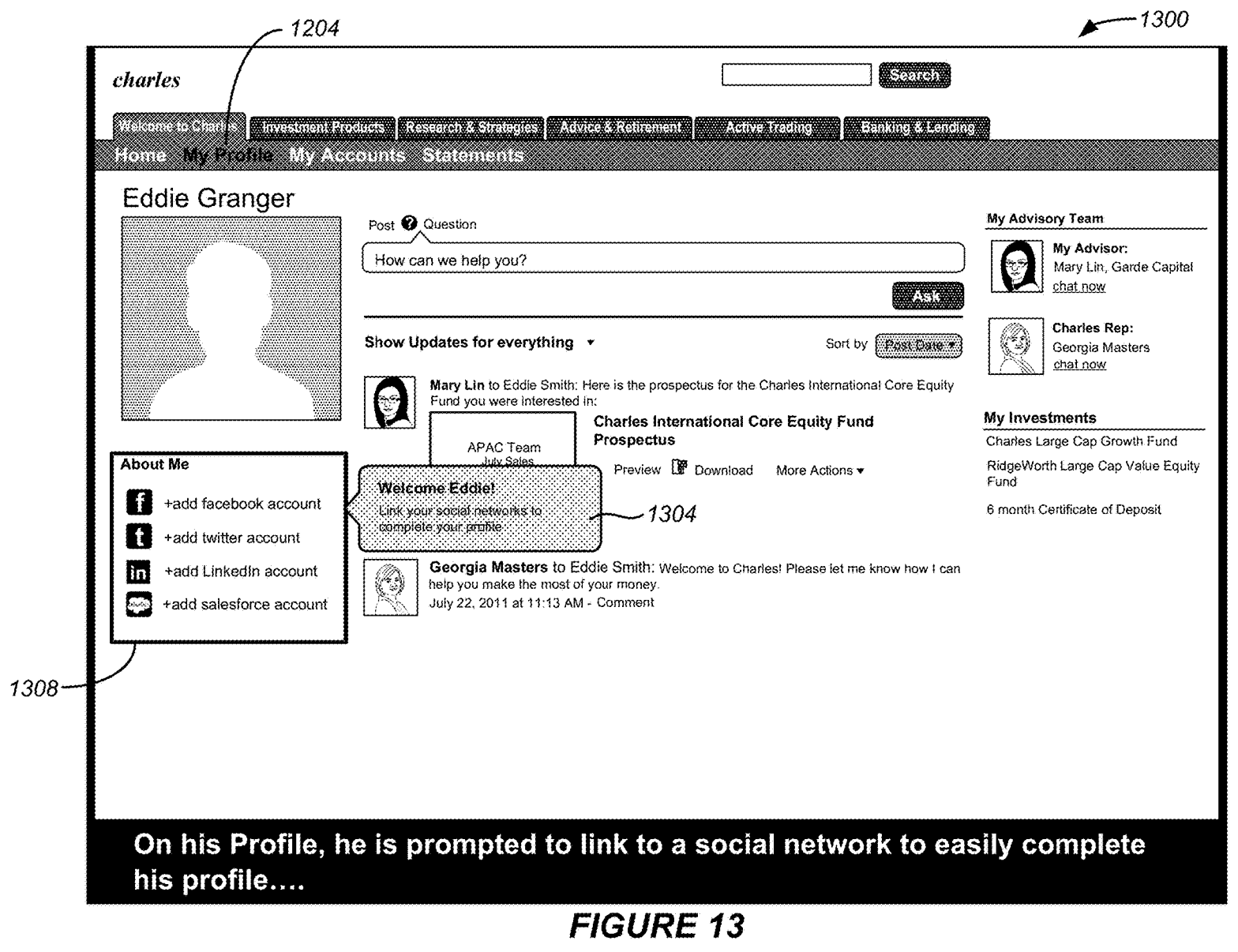
Figure 14:
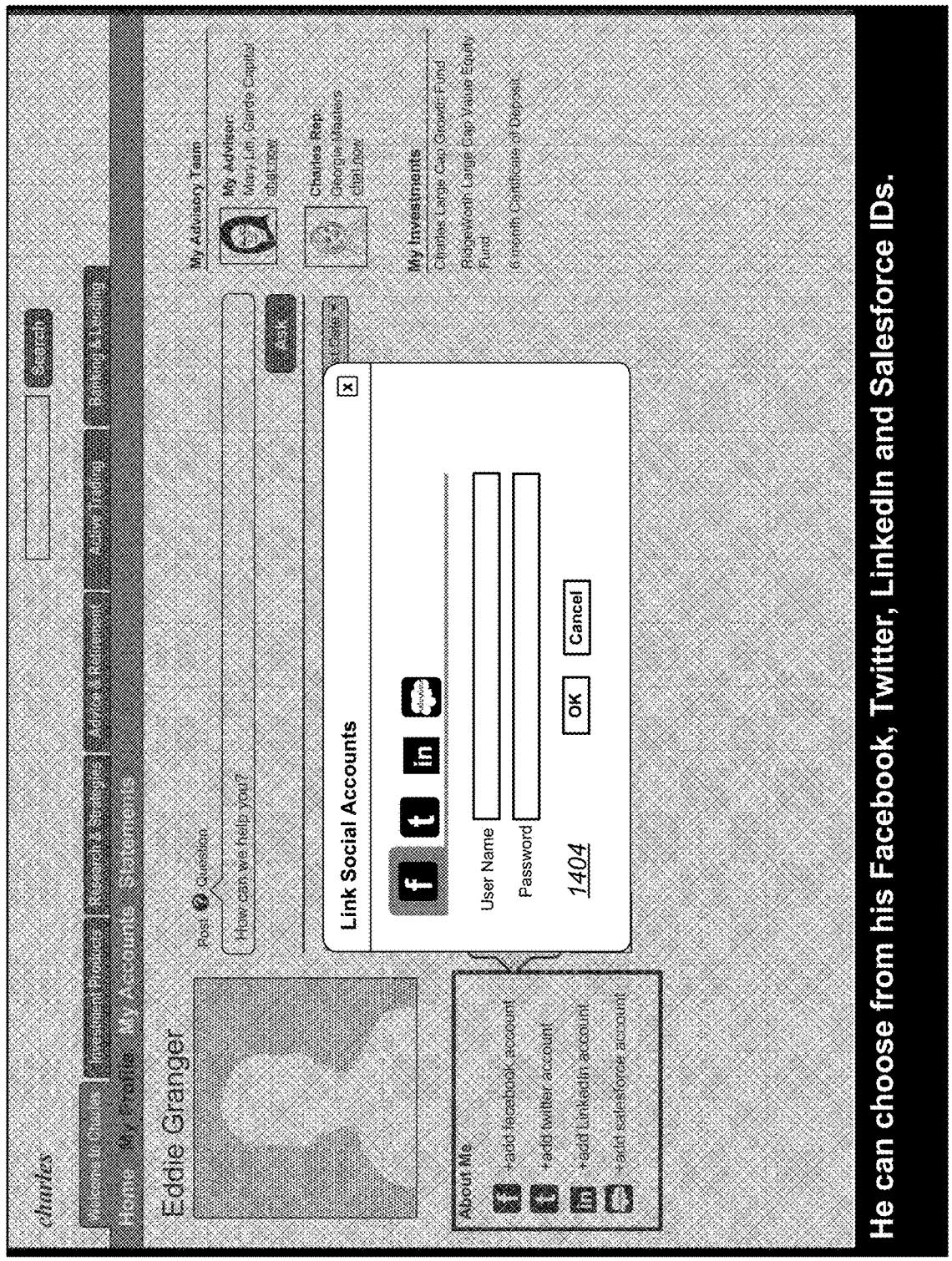

As shown in FIG. 11, Eddie can navigate to a URL including a Charles logo 1102, where Eddie is provided with a log-in screen 1100 prompting him to enter a user ID and password in fields 1104 and 1108. Upon a successful log in, as shown in FIG. 12, Eddie's computer 144 is directed to a Charles community homepage 1200 hosted by social networking system 104. At page 1200, Eddie can edit his profile using tab 1204, access accounts using tab 1208, and retrieve statements using tab 1212. In addition, Eddie's customer homepage 1200 includes a community feed 1216, which includes posts from customer service representatives and other employees of the Charles organization as well as record updates and other information updates regarding objects to which customers have access in this Charles community. As shown in FIG. 13, when Eddie accesses his profile page 1300 by clicking on tab 1204, Eddie is prompted with a notification 1304 to link his Charles user profile with one or more social networking systems identified in pane 1308. Thus, in FIG. 14, Eddie can enter a Facebook®, Twitter®, LinkedIn® or Chatter® user ID and password in pop-up window 1404 to be stored in one or more user ID database tables maintained to identify members of the Charles community, for example, as described above with reference to FIGS. 1-4. That is, in the example of FIG. 4, the same user ID and password used to access a social networking system such as LinkedIn® or Facebook® can be used to also access the Charles community.

Figure 15:
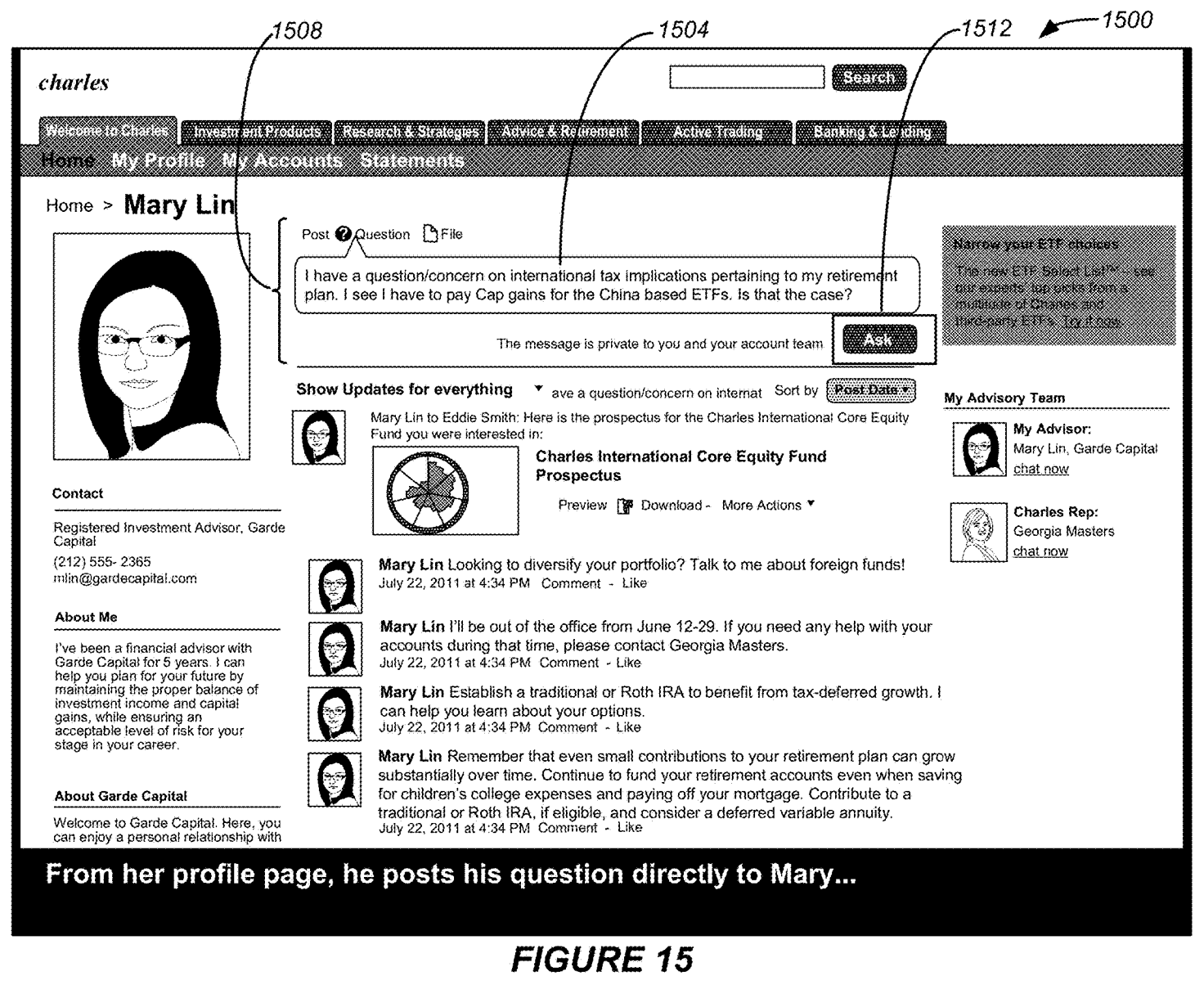
Figure 16:
Figure 17:
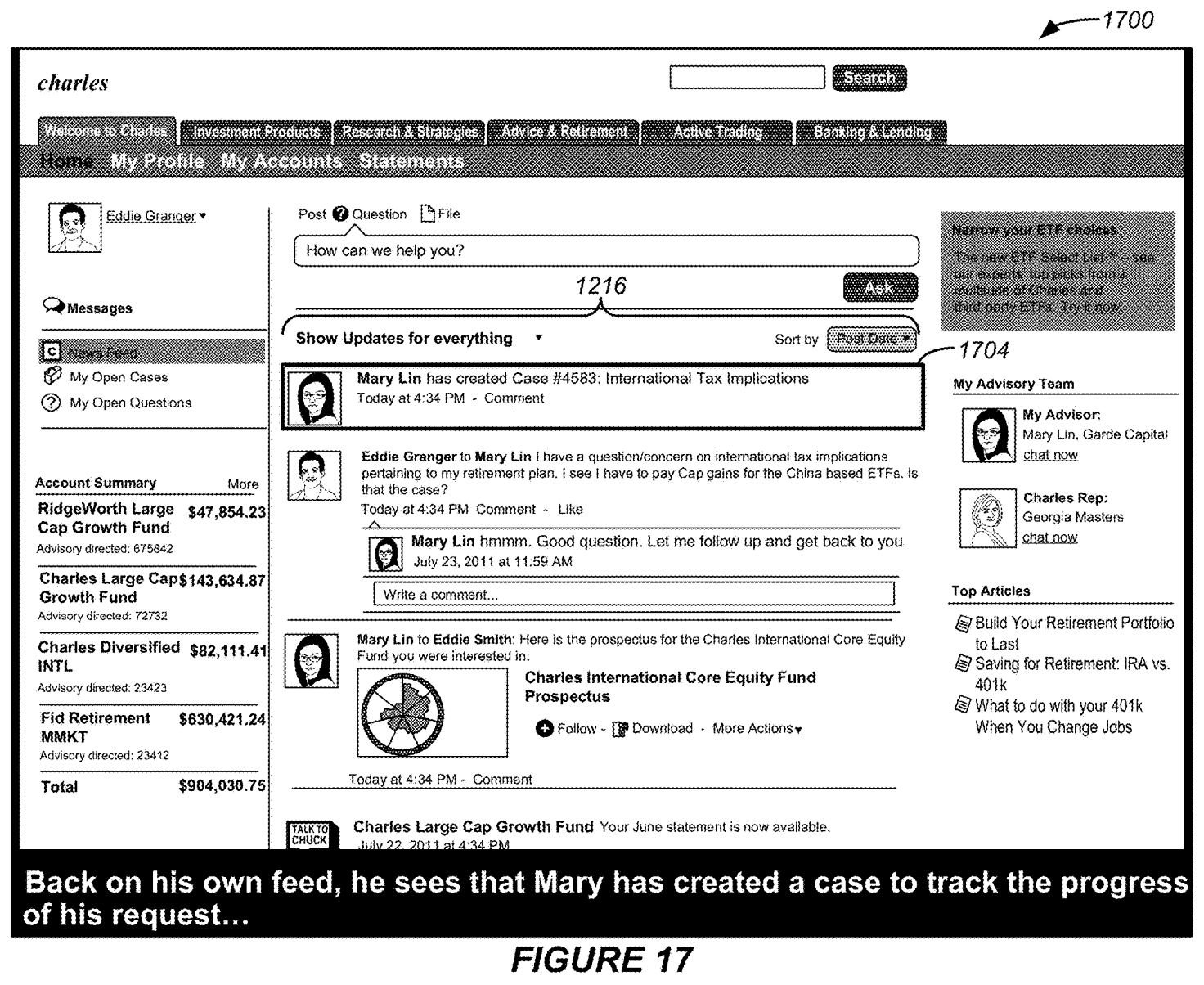

As shown in FIG. 15, by being a customer of the Charles organization, Eddie is able to access and load pages identifying customer service representatives such as Mary Lin, for instance, in the form of Mary Lin's profile page 1500. In this example, Eddie enters a question 1504 in a publisher component 1508 displayed as part of Mary's profile page. When Eddie clicks an ask button 1512, the question 1504 is posted to Mary's profile feed 1604, as shown in FIG. 16. Mary can then enter a comment 1608 in response to Eddie's post 1504, and both the post 1504 and comment 1608 are presented as feed items in profile feed 1604 as shown in FIG. 16. When Eddie returns to his updated profile page 1700, as shown in FIG. 17, Eddie's profile feed 1216 has been updated to include a record update 1704 notifying Eddie that Mary Lin has created a CRM object in the form of a case to work on Eddie's question and track the progress of her investigation. Other customer representatives who are employees of the Charles organization can automatically be notified when such a CRM object is created in this manner, for example, by having record update 1704 automatically posted to their respective news feeds.

Figure 18:
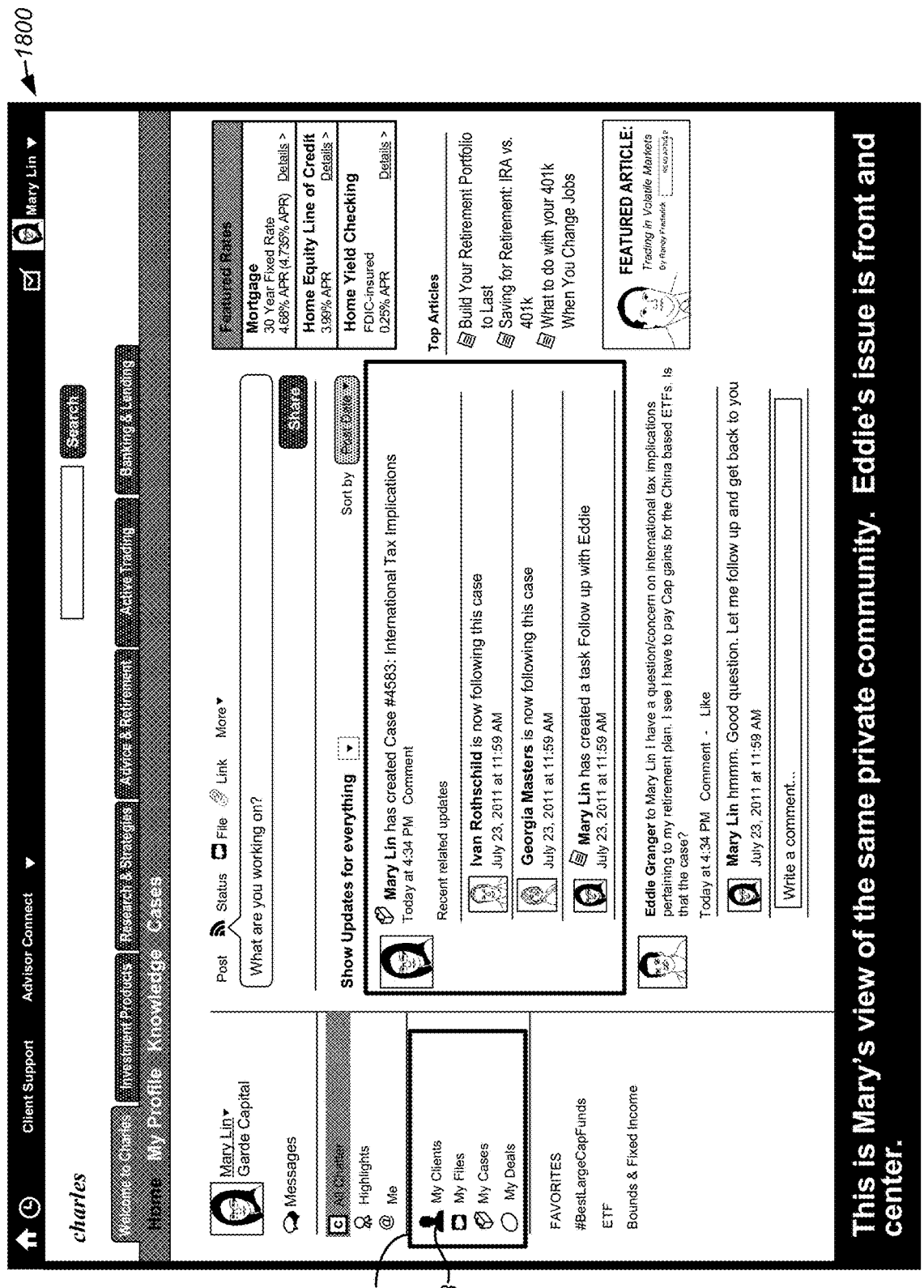
Figure 19:
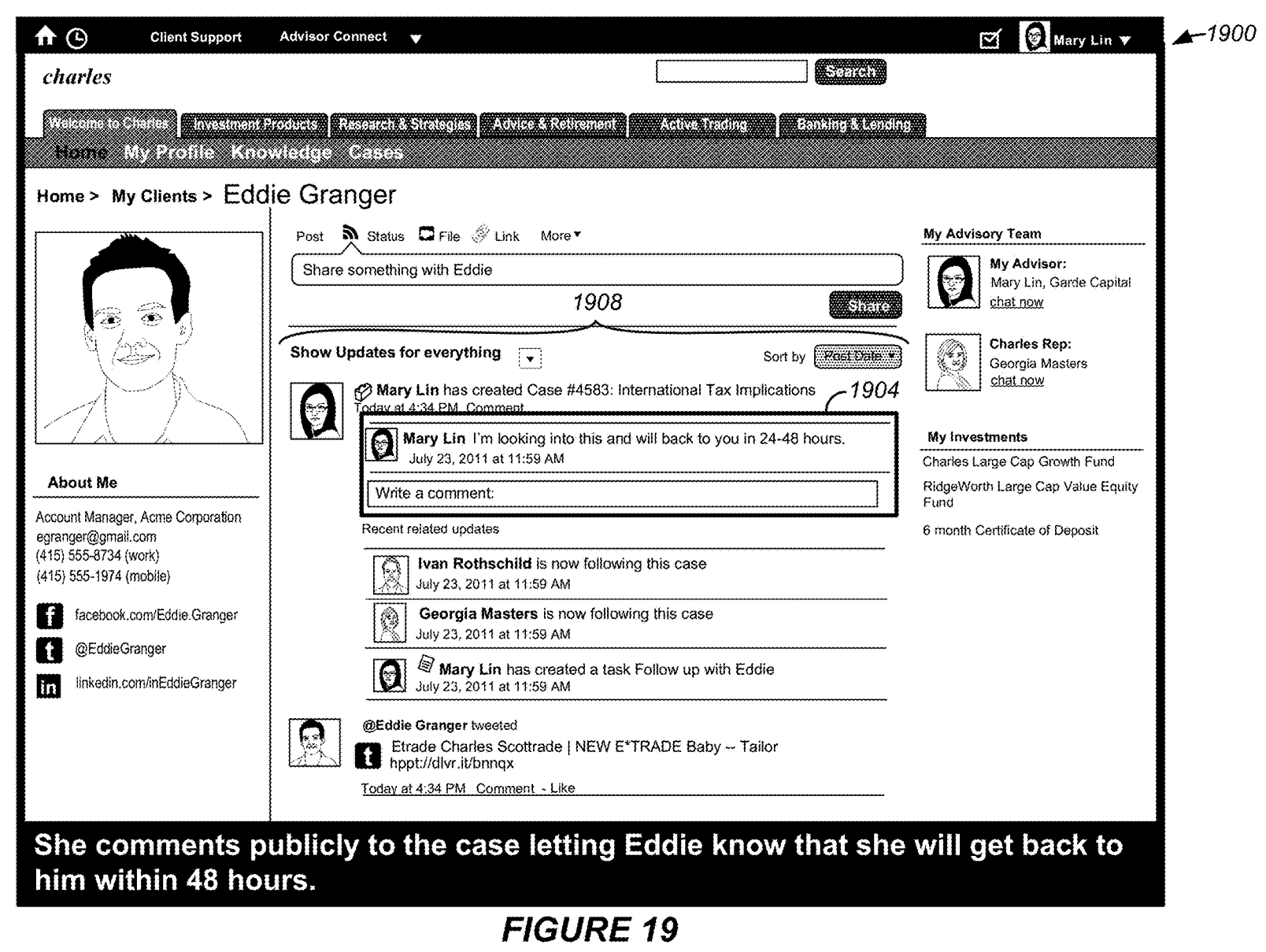

As shown in FIG. 18, when Mary Lin logs in to the Charles community, Mary is presented with a different Charles homepage 1800 than the customer pages available to Eddie. This is because Mary is an employee of the Charles organization, whereas Eddie is a customer. Thus, while branding names, themes and colors are common to both Eddie's and Mary's presentations of the Charles community pages, different login processes and access models as described above can provide access to different data and different rights to take actions for Mary and Eddie. For example, as shown in FIG. 18, Mary has access to records in the form of clients, files, cases and deals as presented in a pane 1804. However, when Eddie logs in to the Charles community and views pages at the community URL, such records in region 1804 are hidden from Eddie's presentation of Charles pages, in accordance with Eddie's restricted privileges. That is, any customers such as Eddie can be prevented from accessing records identifying confidential information of Charles employees and other customers. In this example, customer representatives such as Mary can click on a "My Clients" link 1808 to access a profile page 1900 of a customer such as Eddie, as shown in FIG. 19. In this example, customer representatives such as Mary have unlimited privileges to access Eddie's profile information and submit messages such as a comment 1904 on Eddie's profile feed 1908.

Figure 20:
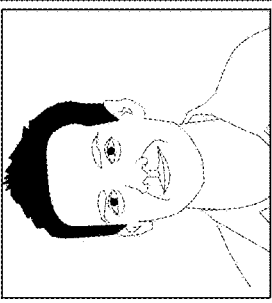
Figure 21:
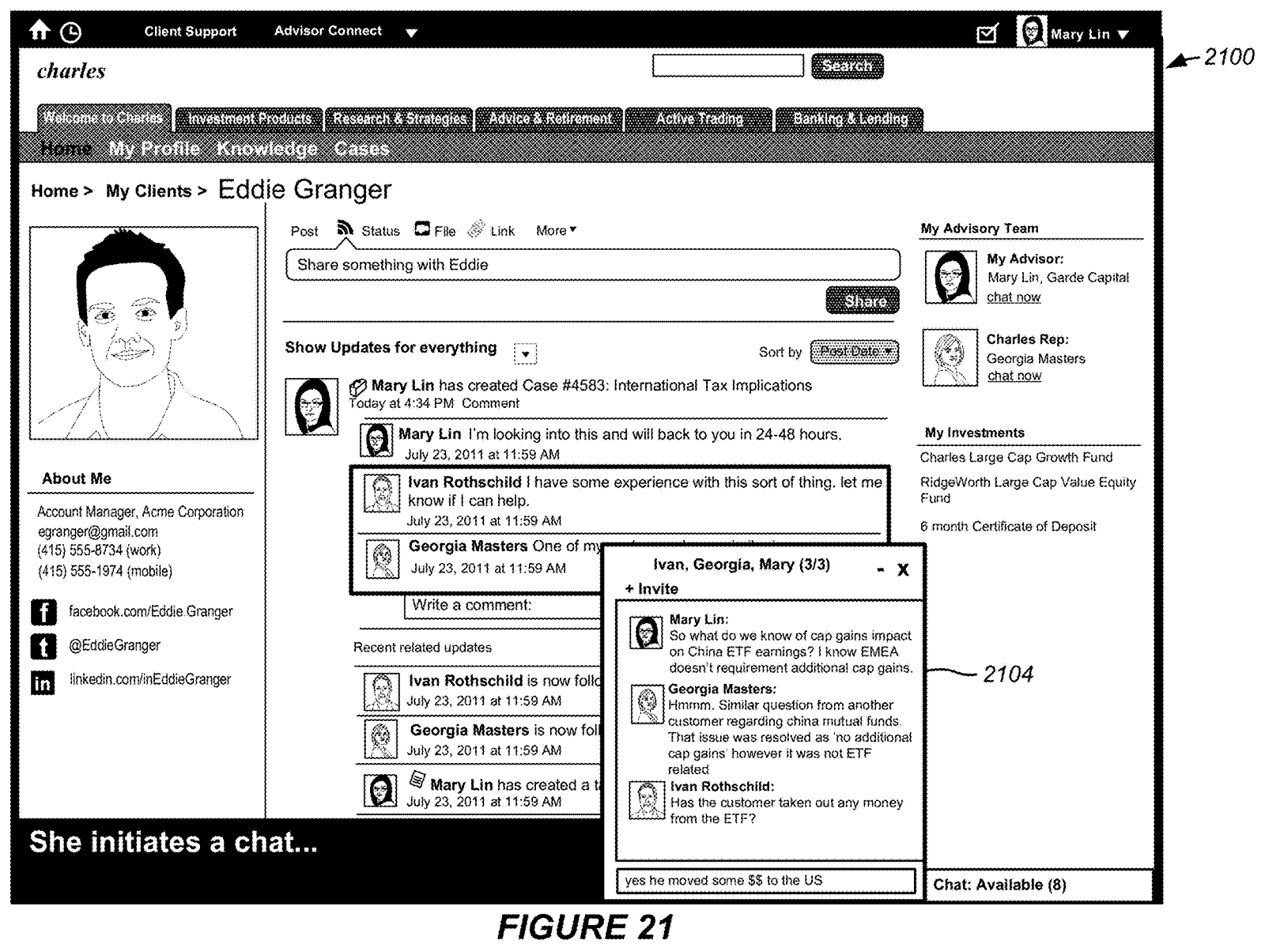

As shown in FIG. 20, other customer representatives Ivan Rothschild and Georgia Masters, who have been automatically subscribed to the new case that Mary created for Eddie, can automatically receive Mary's comment 1904 in their news feeds and can submit their own comments 2004 about the case, as shown in page 2000. In this example, customer representatives, such as Mary, Georgia and Ivan are provided with private chat-room privileges to communicate and collaborate with each other in real-time using a chat window 2104 as shown in FIG. 21. Eddie, as a customer of the Charles organization, has an access model with restrictions preventing Eddie from viewing or otherwise being notified of such a chat among customer representatives.

Figure 22:
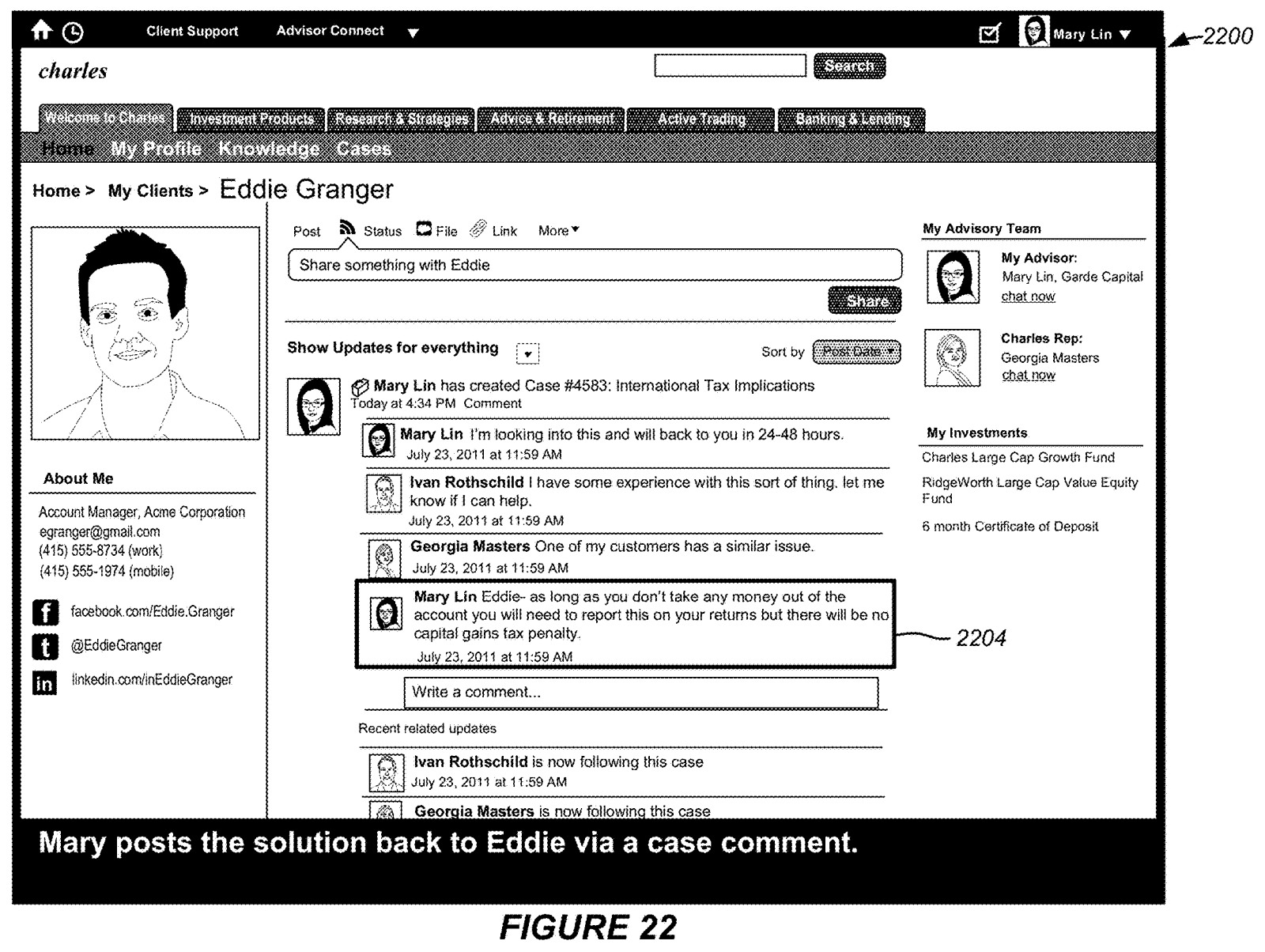
Figure 23:
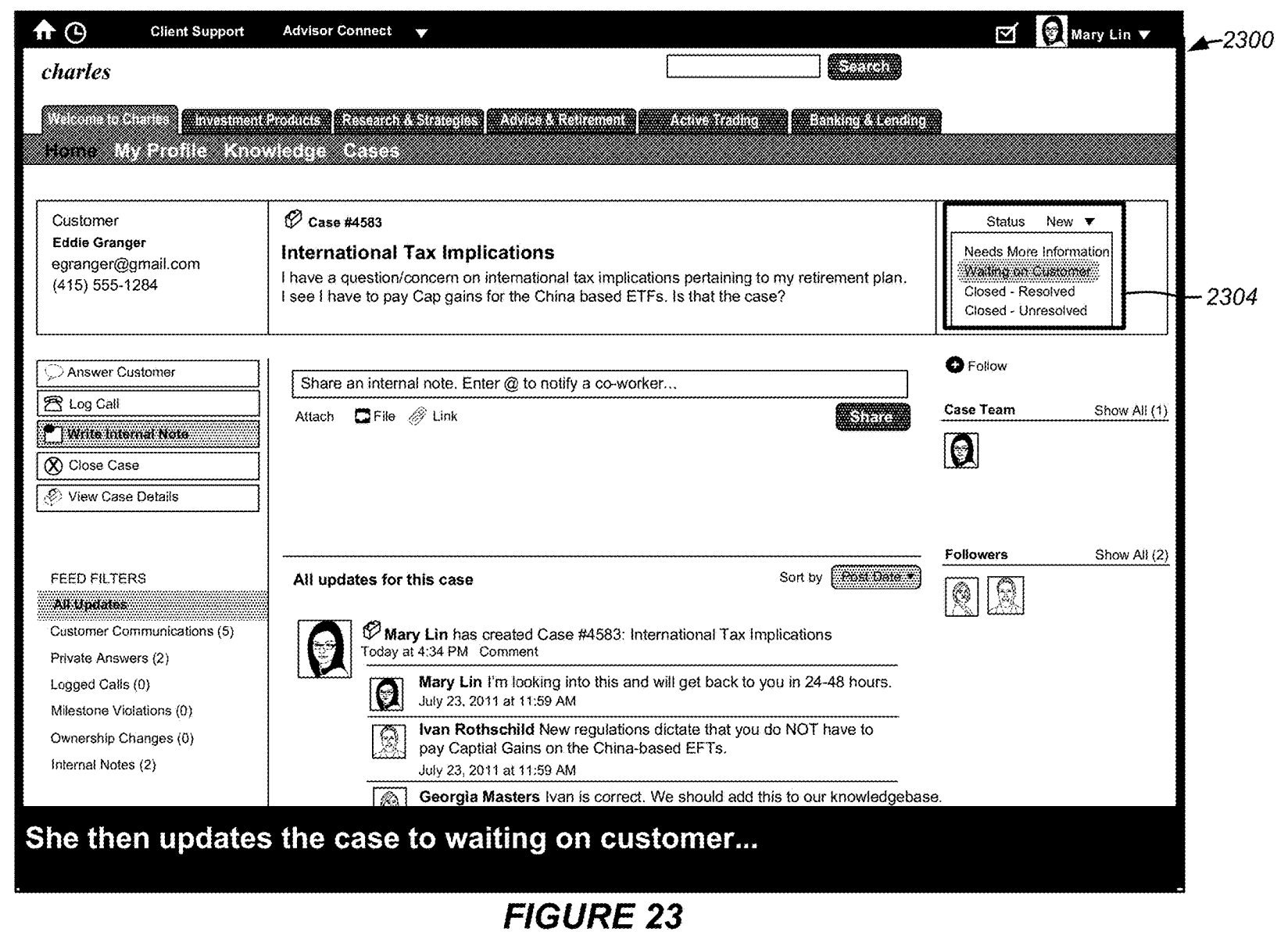

After a solution is reached, as shown in FIG. 22, Mary can post an additional comment 2204 including a proposed solution to the case that Mary created. In this example, the comment 2204 can be viewed by Eddie when he accesses his profile page. As shown in FIG. 23, Mary can then update the status of the case to "Waiting on Customer", which is one of several status options available in a status window 2304. In this example, the status window 2304 is presented as a component of case page 2300 identifying the particular case Mary created to address Eddie's question.

Figure 24:
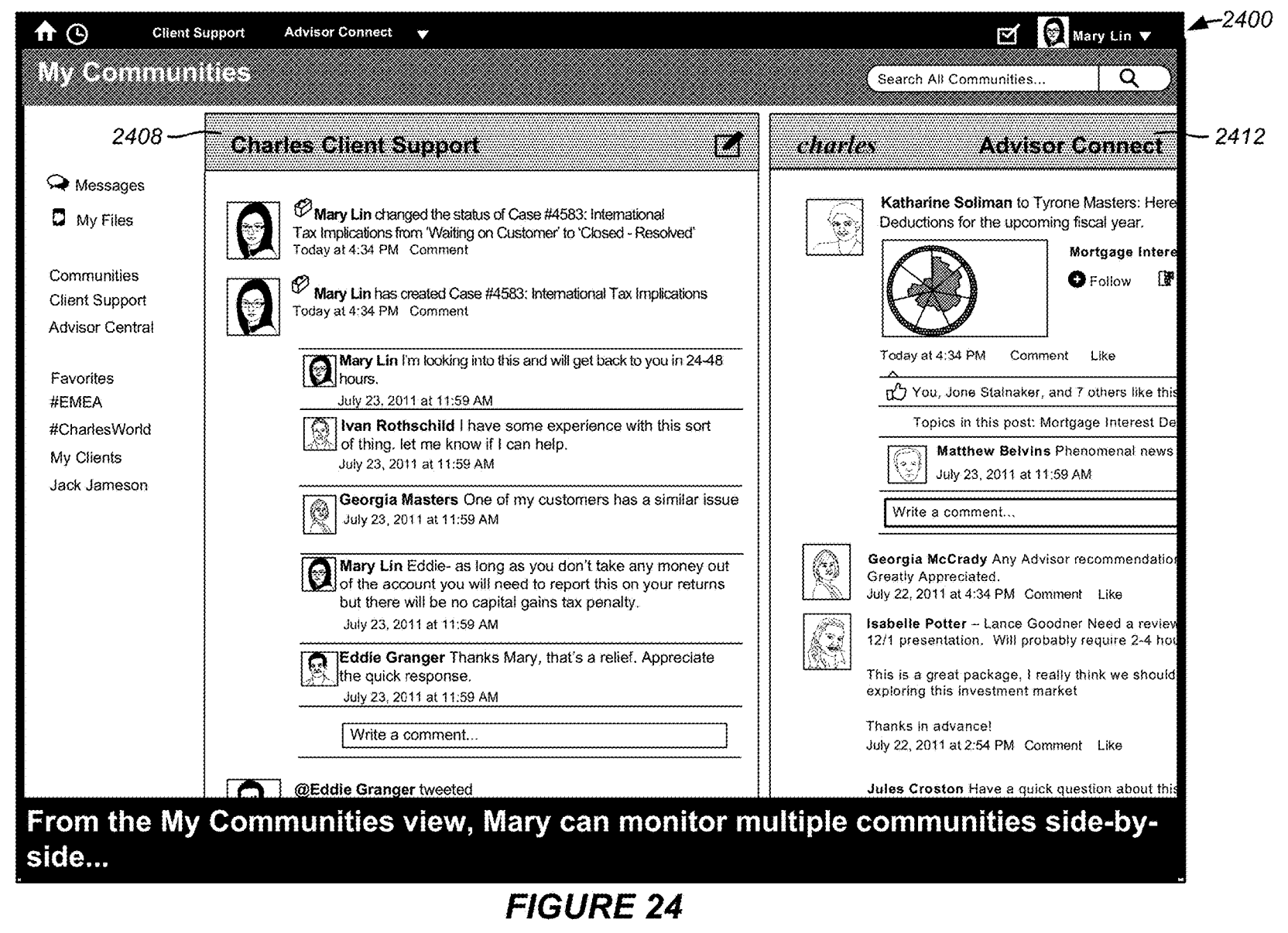
Figure 25:
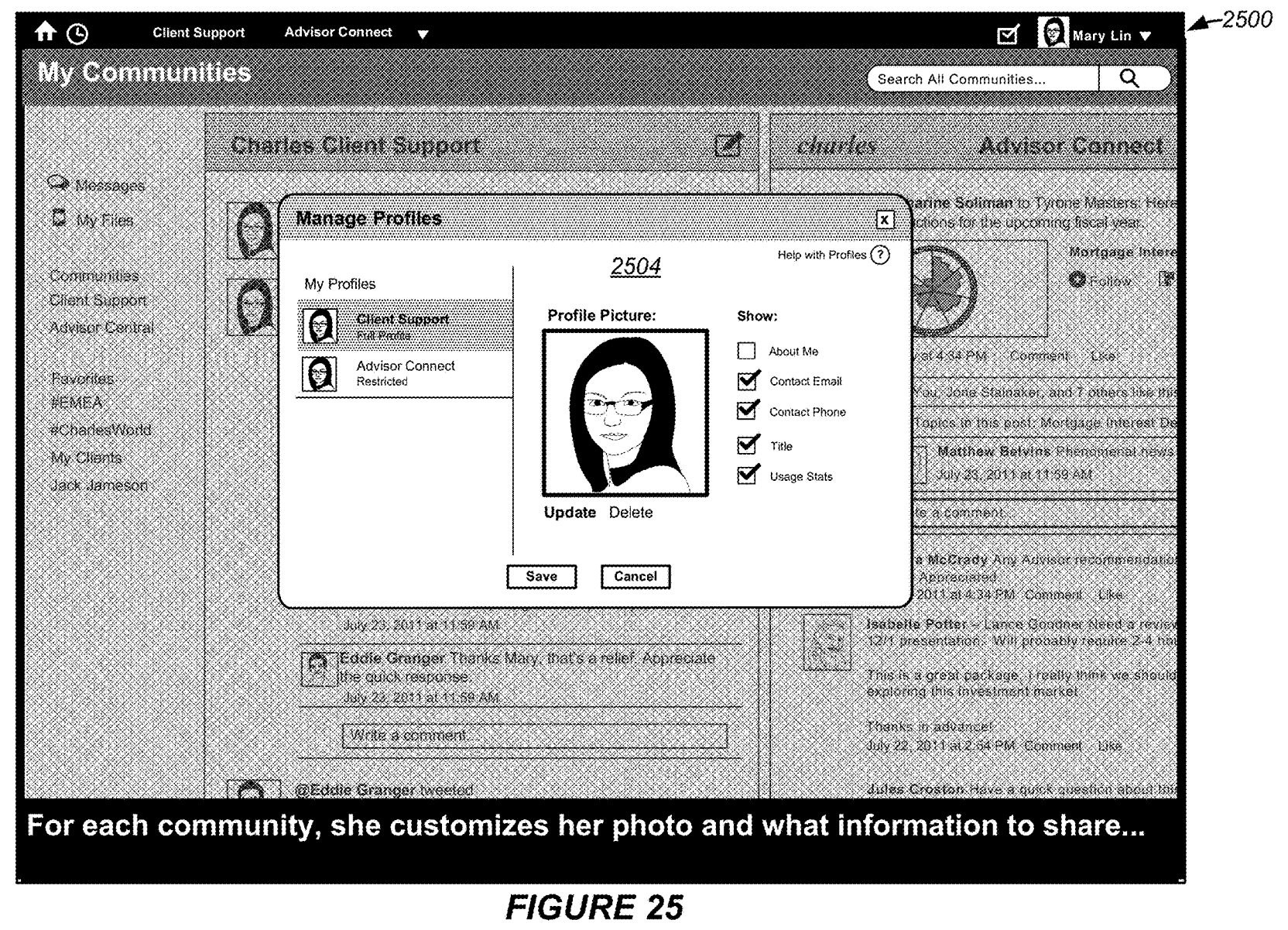

Mary, as a member of multiple communities, some of which are operated on behalf of the Charles organization, can view an overview of these various communities in a "My Communities" page 2400 as shown in FIG. 24. For example, Mary is a member of the "client support" community identified by tab 2408 and the "advisor" community identified by tab 2412. Thus, Mary can monitor feeds of these various communities in the respective tabs 2408 and 2412. In addition, as shown in FIG. 25, Mary can click on the "manage profiles" selection to cause an appropriate pop-up window 2504 to be displayed in page 2500. In pop-up window 2504, Mary can maintain a primary set of profile information and select which parts of the profile information to share with the respective communities. Thus, in the example of FIG. 25, in the client support community, Mary has chosen to expose her email, phone, title and usage stats but hide her "about me" information.

Returning to FIG. 24, Mary can click on an appropriate tab 2408 or 2412 to access a home page for the identified community and thus monitor the community's feed and access files stored for that community. In this example, employees of the Charles organization such as Mary have access models permitting them to take additional actions in a social networking environment, such as creating communities, joining communities, creating groups, joining groups, creating records, and following organizations, records, and customers of the Charles organization. However, the access model for an employee such as Mary prevents Mary from viewing user profiles and accessing private records of executives of the organization. Such access models can be customized as desired for the particular organization, community and user, as explained above with reference to FIGS. 5-7.

Figure 26:
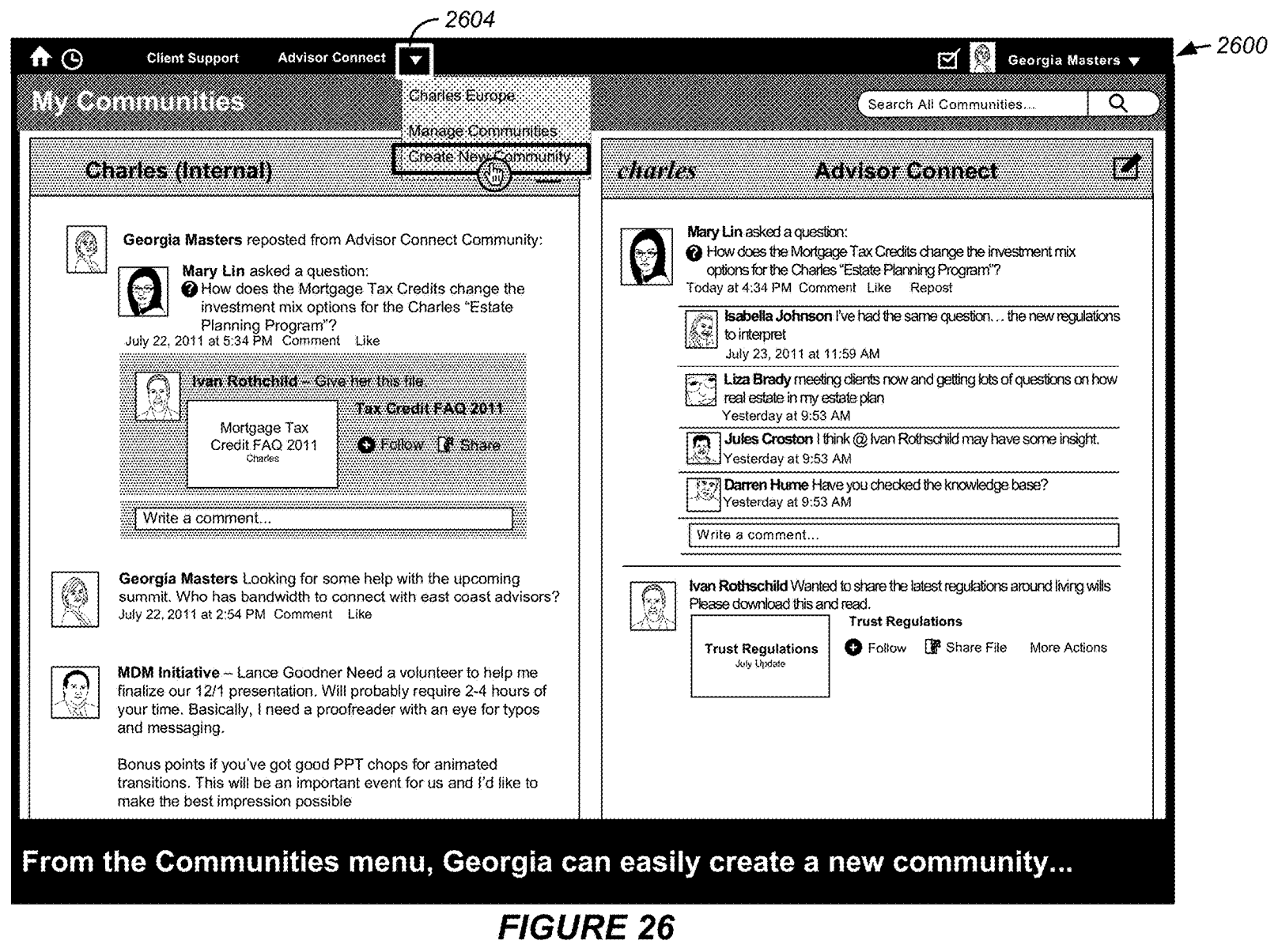
Figure 27:
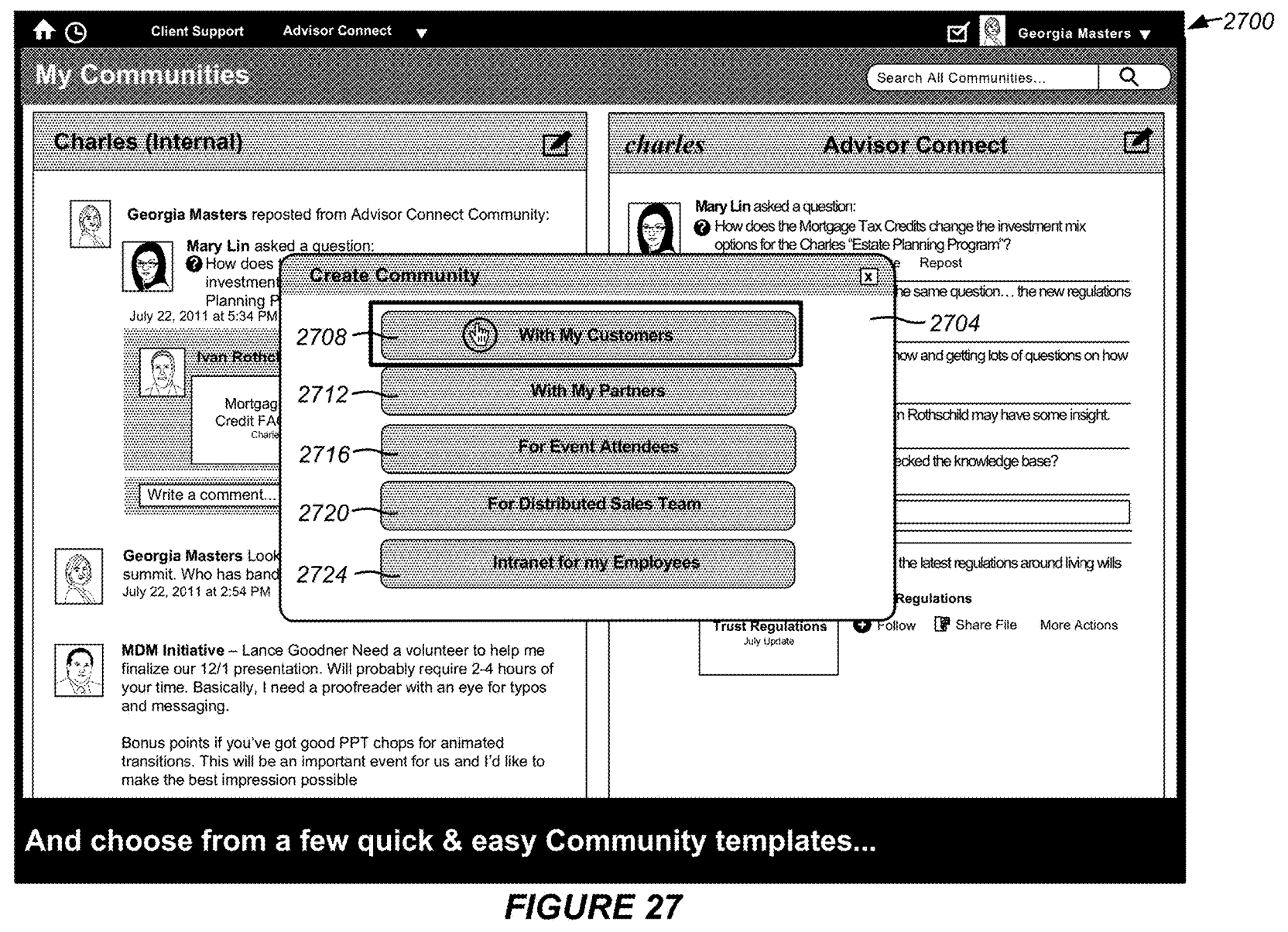

In FIG. 26, a customer representative or other employee of the Charles organization can access a "Create New Community" selection 2604 on her My Communities page to create a new community for the organization. The right to create new communities can be provided to users with one or more defined roles or one or more defined types, such as internal users, as desired by the particular organization. As shown in FIG. 27, in this example, clicking on the Create New Community selection 2604 causes a pop-up window 2704 to be displayed as an overlay on the page. In this example the pop-up window 2704 navigates the user through the various attributes of a community being created, such as the particular users who will be invited to join or automatically be added to the community. Thus, the customer representative can identify customers using option 2708, partners using option 2712, event attendees using option 2716, a designated sales team using option 2720 and/or other employees using option 2724.

Figure 28:
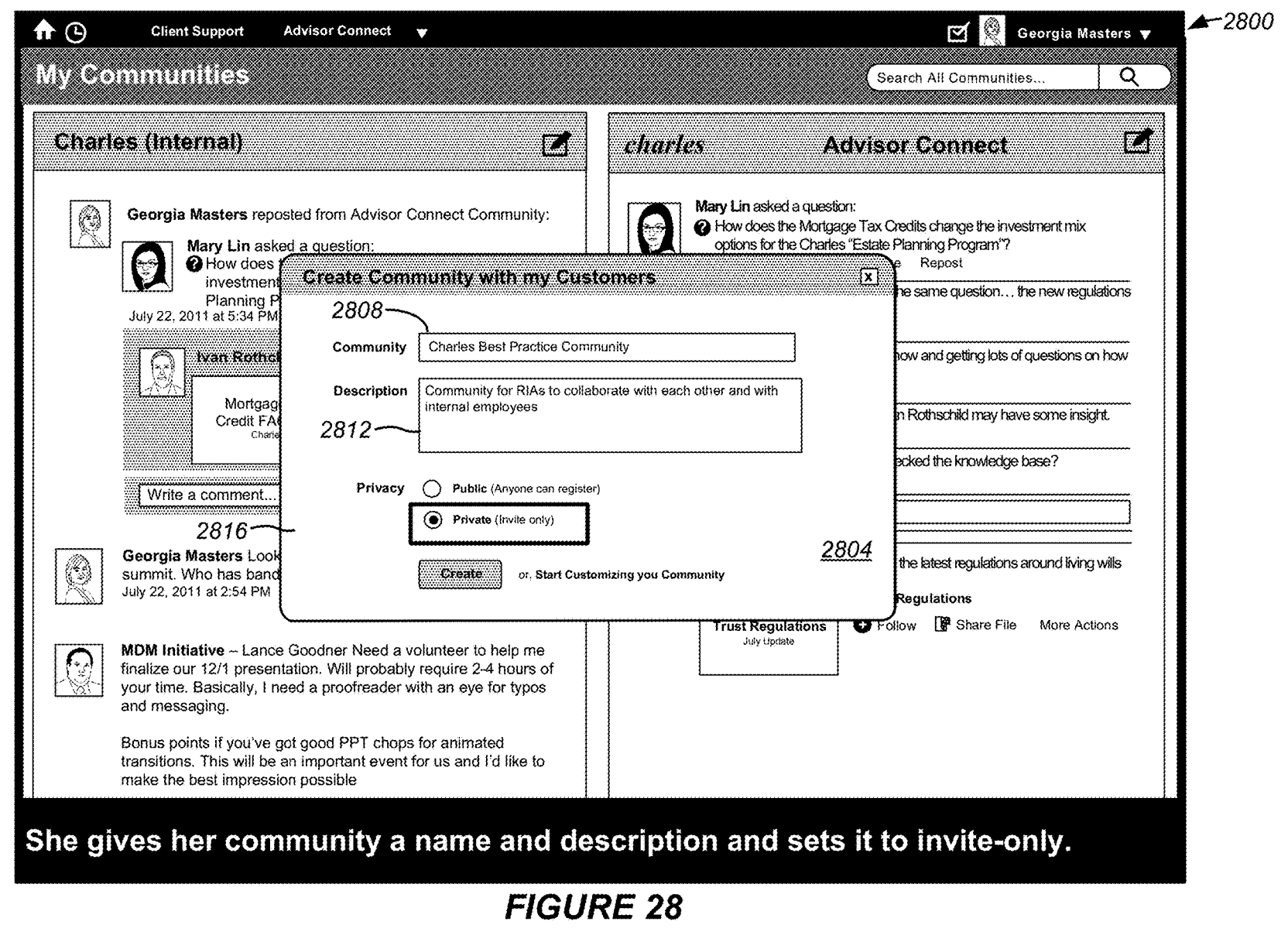
Figure 29:
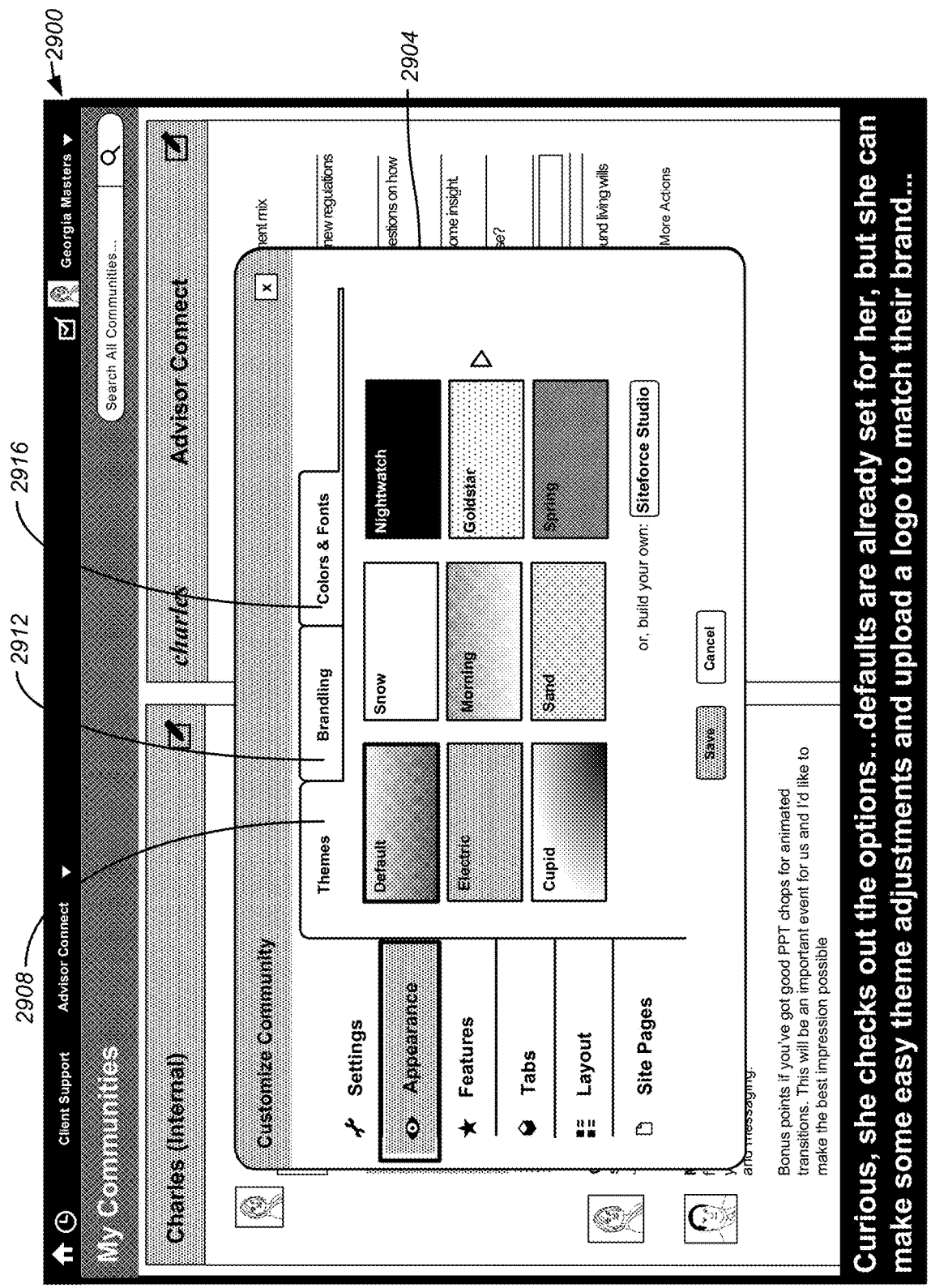

As shown in FIG. 28, an additional pop-up window 2804 displayed as an overlay on the page allows the user setting up the community to enter a community name in field 2808 and a description of the community's purpose in field 2812. The type of the community can be specified as private or public using "privacy" selections 2816. As shown in FIG. 29, additional customization options are available, using a pop-up window 2904 to select themes 2908, branding data 2912, and colors and fonts 2916 to customize the appearance of community pages. For instance, a "Charles" logo used to identify Charles products and services can be uploaded in the form of a JPEG image. In addition, as mentioned above, a URL for the community can be specified to include the name "Charles" and/or the names of various products and services offered by Charles that relate to the community's purpose. Thus, the URL can include brand names to associate the community with the desired organizational data.

Figure 30:
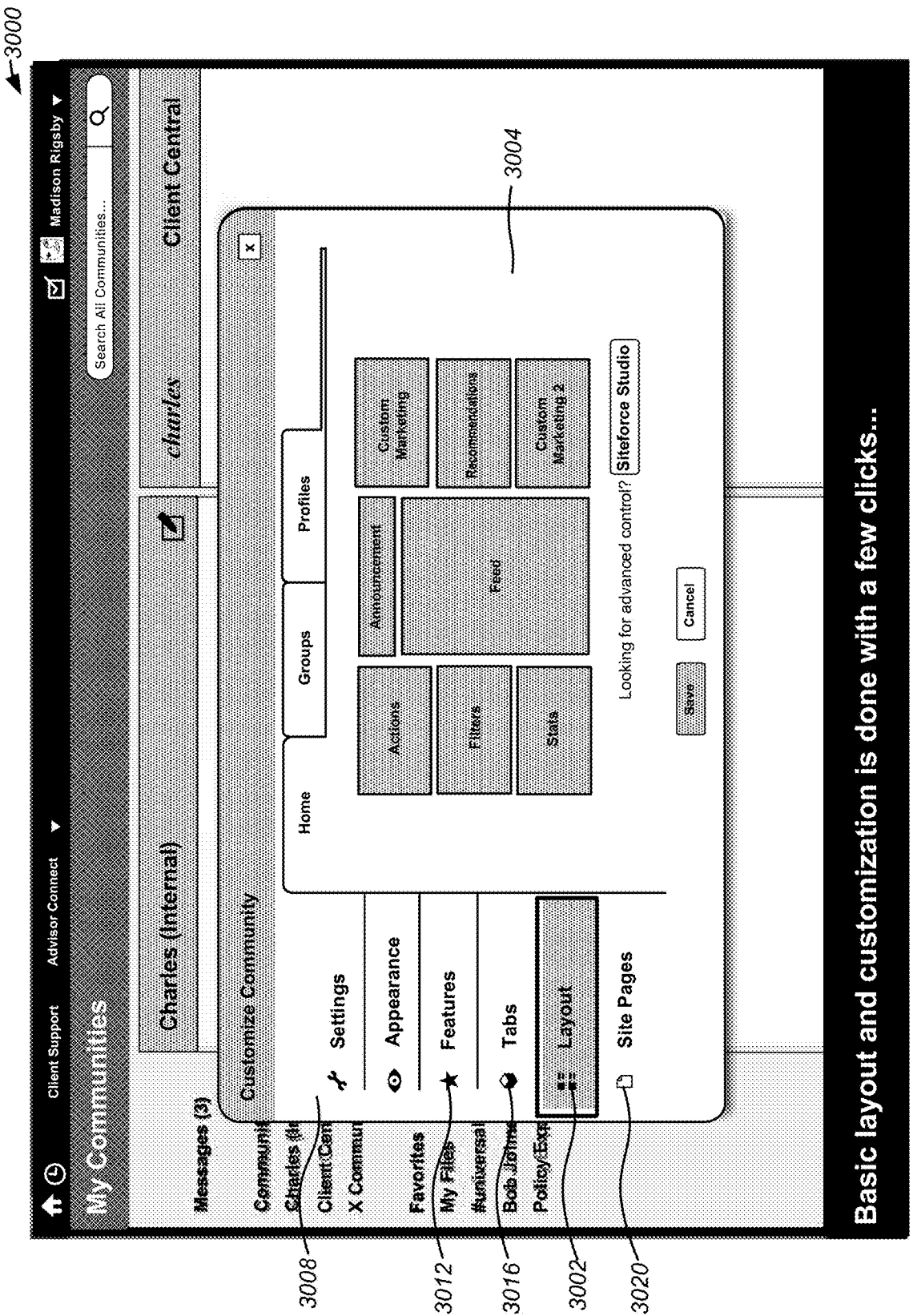

As shown in FIG. 30, the pages of a community can be further customized to have a specified layout 3002 using pop-up window 3004 as well as have designated settings 3008, features 3012, tabs 3016 and site pages 3020, the URLs of which being customized as described above.

Additional examples of systems, apparatus, and methods are disclosed herein for implementing enterprise level social and business information networking. Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Mechanisms and methods for providing systems implementing enterprise level social and business information networking are disclosed herein with reference to several implementations. Examples of database systems are described and can provide a platform for tracking events related to a record, actions of a user, and messages about a user or record. The disclosed systems support various data structures of feeds, the customization of feeds, selection of records and users to follow, generation of feeds, and display of feeds in suitable presentations on a user's display device.

FIG. 31A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 31A (and in more detail in FIG. 31B) user systems 12 might interact via a network 14 with an on-demand database service, which is implemented in the example of FIG. 31A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 31A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIGS. 31A and 31B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 31A include conventional, well-known elements that are explained only briefly here. For example, each user system 12 could include a desktop personal computer, workstation, laptop, PDA, tablet, smartphone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 31B shows a block diagram of an example of some implementations of elements of FIG. 31A and various possible interconnections between these elements. That is, FIG. 31B also illustrates environment 10. However, in FIG. 31B elements of system 16 and various interconnections in some implementations are further illustrated. FIG. 31B shows that user system 12 may include processor system 12A, memory system 12B, input system 12C, and output system 12D. FIG. 31B shows network 14 and system 16. FIG. 31B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 31A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 31B, system 16 may include a network interface 20 (of FIG. 31A) implemented as a set of HTTP application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle □ databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc.

In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 32A:
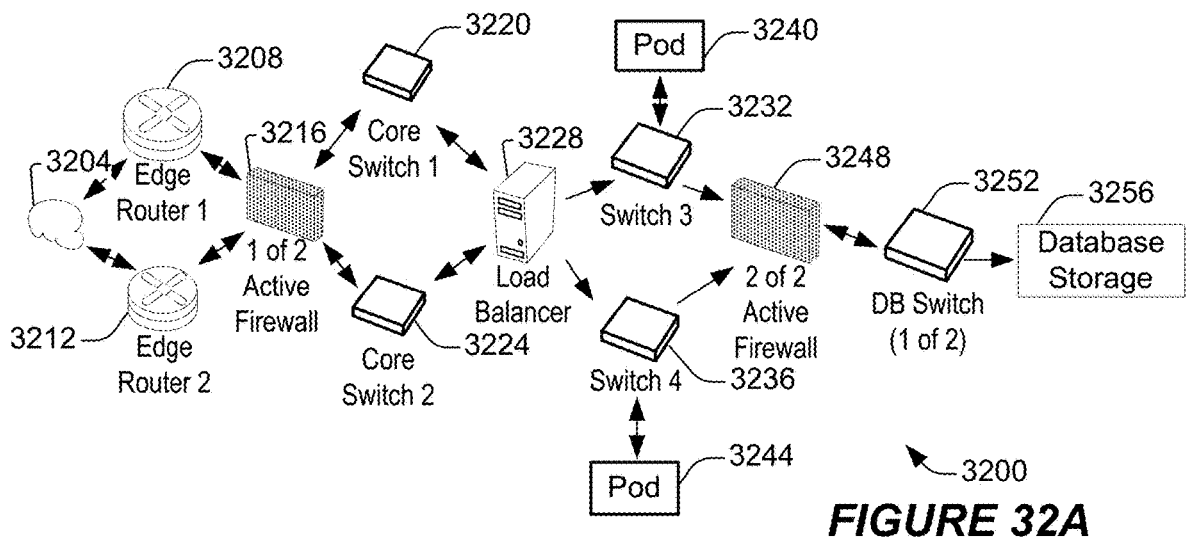
FIG. 32A shows a system diagram illustrating an example of architectural components of an on-demand database service environment 3200 according to some implementations.

FIG. 32A shows a system diagram illustrating an example of architectural components of an on-demand database service environment 3200 according to some implementations. A client machine located in the cloud 3204, generally referring to one or more networks in combination, as described herein, may communicate with the on-demand database service environment via one or more edge routers 3208 and 3212. A client machine can be any of the examples of user systems 12 described above. The edge routers may communicate with one or more core switches 3220 and 3224 via firewall 3216. The core switches may communicate with a load balancer 3228, which may distribute server load over different pods, such as the pods 3240 and 3244. The pods 3240 and 3244, which may each include one or more servers and/or other computing resources, may perform data processing and other operations used to provide on-demand services. Communication with the pods may be conducted via pod switches 3232 and 3236. Components of the on-demand database service environment may communicate with a database storage 3256 via a database firewall 3248 and a database switch 3252.

Figure 32B:
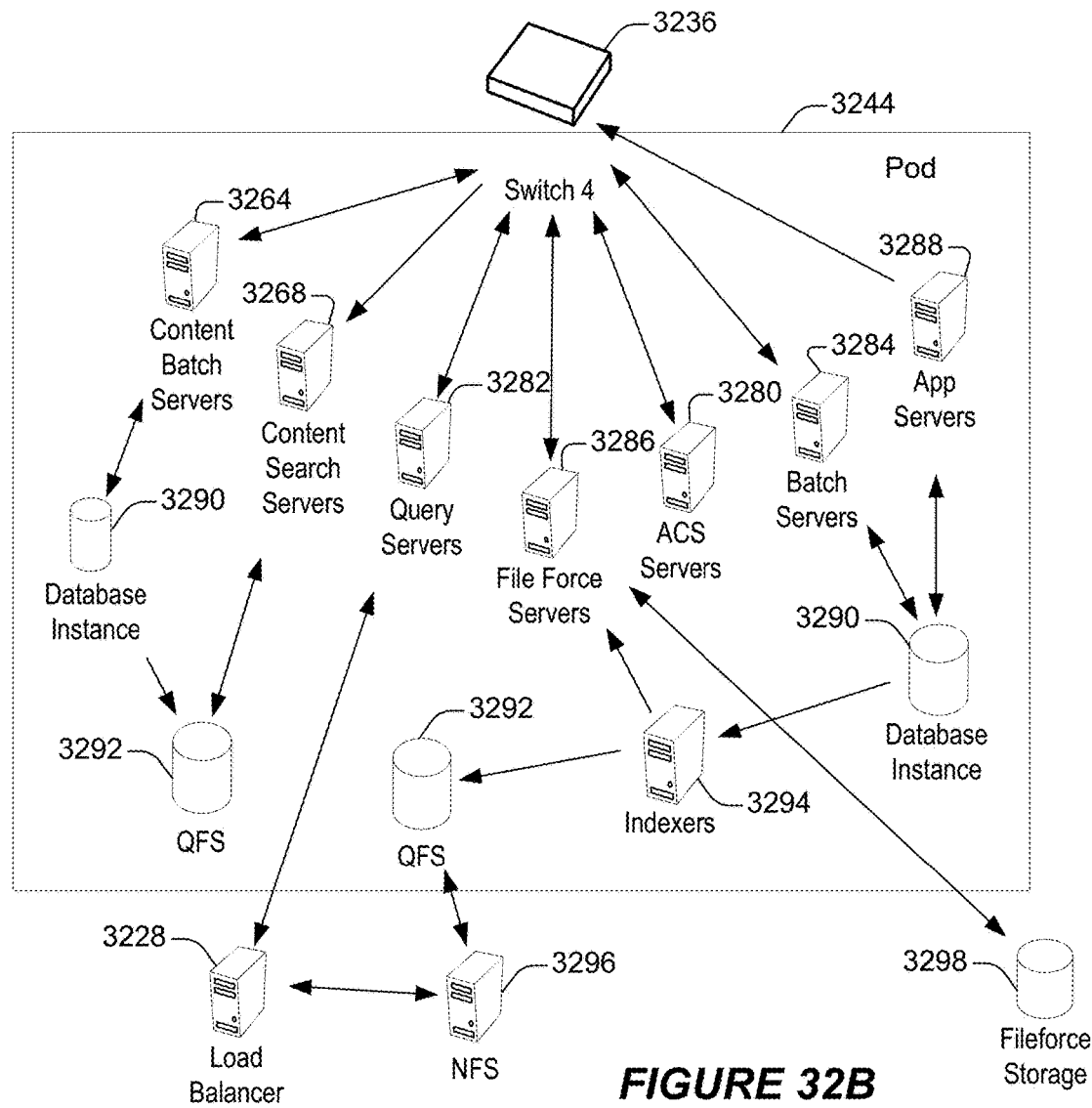
FIG. 32B shows a system diagram further illustrating an example of architectural components of an on-demand database service environment according to some implementations.

As shown in FIGS. 32A and 32B, accessing an on-demand database service environment may involve communications transmitted among a variety of different hardware and/or software components. Further, the on-demand database service environment 3200 is a simplified representation of an actual on-demand database service environment. For example, while only one or two devices of each type are shown in FIGS. 32A and 32B, some implementations of an on-demand database service environment may include anywhere from one to many devices of each type. Also, the on-demand database service environment need not include each device shown in FIGS. 32A and 32B, or may include additional devices not shown in FIGS. 32A and 32B.

Moreover, one or more of the devices in the on-demand database service environment 3200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 3204 is intended to refer to a data network or plurality of data networks, often including the Internet. Client machines located in the cloud 3204 may communicate with the on-demand database service environment to access services provided by the on-demand database service environment. For example, client machines may access the on-demand database service environment to retrieve, store, edit, and/or process information.

In some implementations, the edge routers 3208 and 3212 route packets between the cloud 3204 and other components of the on-demand database service environment 3200. The edge routers 3208 and 3212 may employ the Border Gateway Protocol (BGP). The BGP is the core routing protocol of the Internet. The edge routers 3208 and 3212 may maintain a table of IP networks or 'prefixes', which designate network reachability among autonomous systems on the Internet.

In one or more implementations, the firewall 3216 may protect the inner components of the on-demand database service environment 3200 from Internet traffic. The firewall 3216 may block, permit, or deny access to the inner components of the on-demand database service environment 3200 based upon a set of rules and other criteria. The firewall 3216 may act as one or more of a packet filter, an application gateway, a stateful filter, a proxy server, or any other type of firewall.

In some implementations, the core switches 3220 and 3224 are high-capacity switches that transfer packets within the on-demand database service environment 3200. The core switches 3220 and 3224 may be configured as network bridges that quickly route data between different components within the on-demand database service environment. In some implementations, the use of two or more core switches 3220 and 3224 may provide redundancy and/or reduced latency.

In some implementations, the pods 3240 and 3244 may perform the core data processing and service functions provided by the on-demand database service environment. Each pod may include various types of hardware and/or software computing resources. An example of the pod architecture is discussed in greater detail with reference to FIG. 32B.

In some implementations, communication between the pods 3240 and 3244 may be conducted via the pod switches 3232 and 3236. The pod switches 3232 and 3236 may facilitate communication between the pods 3240 and 3244 and client machines located in the cloud 3204, for example via core switches 3220 and 3224. Also, the pod switches 3232 and 3236 may facilitate communication between the pods 3240 and 3244 and the database storage 3256.

In some implementations, the load balancer 3228 may distribute workload between the pods 3240 and 3244. Balancing the on-demand service requests between the pods may assist in improving the use of resources, increasing throughput, reducing response times, and/or reducing overhead. The load balancer 3228 may include multilayer switches to analyze and forward traffic.

In some implementations, access to the database storage 3256 may be guarded by a database firewall 3248. The database firewall 3248 may act as a computer application firewall operating at the database application layer of a protocol stack. The database firewall 3248 may protect the database storage 3256 from application attacks such as structure query language (SQL) injection, database rootkits, and unauthorized information disclosure.

In some implementations, the database firewall 3248 may include a host using one or more forms of reverse proxy services to proxy traffic before passing it to a gateway router. The database firewall 3248 may inspect the contents of database traffic and block certain content or database requests. The database firewall 3248 may work on the SQL application level atop the TCP/IP stack, managing applications' connection to the database or SQL management interfaces as well as intercepting and enforcing packets traveling to or from a database network or application interface.

In some implementations, communication with the database storage 3256 may be conducted via the database switch 3252. The multi-tenant database storage 3256 may include more than one hardware and/or software components for handling database queries. Accordingly, the database switch 3252 may direct database queries transmitted by other components of the on-demand database service environment (e.g., the pods 3240 and 3244) to the correct components within the database storage 3256.

In some implementations, the database storage 3256 is an on-demand database system shared by many different organizations. The on-demand database system may employ a multi-tenant approach, a virtualized approach, or any other type of database approach. An on-demand database system is discussed in greater detail with reference to FIGS. 31A and 31B.

FIG. 32B shows a system diagram further illustrating an example of architectural components of an on-demand database service environment according to some implementations. The pod 3244 may be used to render services to a user of the on-demand database service environment 3200. In some implementations, each pod may include a variety of servers and/or other systems. The pod 3244 includes one or more content batch servers 3264, content search servers 3268, query servers 3282, file force servers 3286, access control system (ACS) servers 3280, batch servers 3284, and app servers 3288. Also, the pod 3244 includes database instances 3290, quick file systems (QFS) 3292, and indexers 3294. In one or more implementations, some or all communication between the servers in the pod 3244 may be transmitted via the switch 3236.

In some implementations, the app servers 3288 may include a hardware and/or software framework dedicated to the execution of procedures (e.g., programs, routines, scripts) for supporting the construction of applications provided by the on-demand database service environment 3200 via the pod 3244. In some implementations, the hardware and/or software framework of an app server 3288 is configured to execute operations of the services described herein, including performance of the blocks of methods described with reference to FIGS. 1-30. In alternative implementations, two or more app servers 3288 may be included and cooperate to perform such methods, or one or more other servers described herein can be configured to perform the disclosed methods.

The content batch servers 3264 may handle requests internal to the pod. These requests may be long-running and/or not tied to a particular customer. For example, the content batch servers 3264 may handle requests related to log mining, cleanup work, and maintenance tasks.

The content search servers 3268 may provide query and indexer functions. For example, the functions provided by the content search servers 3268 may allow users to search through content stored in the on-demand database service environment.

The file force servers 3286 may manage requests for information stored in the Fileforce storage 3298. The Fileforce storage 3298 may store information such as documents, images, and basic large objects (BLOBs). By managing requests for information using the file force servers 3286, the image footprint on the database may be reduced.

The query servers 3282 may be used to retrieve information from one or more file systems. For example, the query system 3282 may receive requests for information from the app servers 3288 and then transmit information queries to the NFS 3296 located outside the pod.

The pod 3244 may share a database instance 3290 configured as a multi-tenant environment in which different organizations share access to the same database. Additionally, services rendered by the pod 3244 may call upon various hardware and/or software resources. In some implementations, the ACS servers 3280 may control access to data, hardware resources, or software resources.

In some implementations, the batch servers 3284 may process batch jobs, which are used to run tasks at specified times. Thus, the batch servers 3284 may transmit instructions to other servers, such as the app servers 3288, to trigger the batch jobs.

In some implementations, the QFS 3292 may be an open source file system available from Sun Microsystems® of Santa Clara, Calif. The QFS may serve as a rapid-access file system for storing and accessing information available within the pod 3244. The QFS 3292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 3268 and/or indexers 3294 to identify, retrieve, move, and/or update data stored in the network file systems 3296 and/or other storage systems.

In some implementations, one or more query servers 3282 may communicate with the NFS 3296 to retrieve and/or update information stored outside of the pod 3244. The NFS 3296 may allow servers located in the pod 3244 to access information to access files over a network in a manner similar to how local storage is accessed.

In some implementations, queries from the query servers 3222 may be transmitted to the NFS 3296 via the load balancer 3228, which may distribute resource requests over various resources available in the on-demand database service environment. The NFS 3296 may also communicate with the QFS 3292 to update the information stored on the NFS 3296 and/or to provide information to the QFS 3292 for use by servers located within the pod 3244.

In some implementations, the pod may include one or more database instances 3290. The database instance 3290 may transmit information to the QFS 3292. When information is transmitted to the QFS, it may be available for use by servers within the pod 3244 without using an additional database call.

In some implementations, database information may be transmitted to the indexer 3294. Indexer 3294 may provide an index of information available in the database 3290 and/or QFS 3292. The index information may be provided to file force servers 3286 and/or the QFS 3292.

As multiple users might be able to change the data of a record, it can be useful for certain users to be notified when a record is updated. Also, even if a user does not have authority to change a record, the user still might want to know when there is an update to the record. For example, a vendor may negotiate a new price with a salesperson of company X, where the salesperson is a user associated with tenant Y. As part of creating a new invoice or for accounting purposes, the salesperson can change the price saved in the database. It may be important for co-workers to know that the price has changed. The salesperson could send an email to certain people, but this is onerous and the salesperson might not email all of the people who need to know or want to know. Accordingly, some implementations of the disclosed techniques can inform others (e.g., co-workers) who want to know about an update to a record automatically.

The tracking and reporting of updates to a record stored in a database system can be facilitated with a multi-tenant database system 16, e.g., by one or more processors configured to receive or retrieve information, process the information, store results, and transmit the results. In other implementations, the tracking and reporting of updates to a record may be implemented at least partially with a single tenant database system.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. An enterprise social networking system for providing restricted communities comprising internal communities for collaboration with users inside of an organization and external communities for collaboration with users outside of an organization, the enterprise social networking system comprising:
a database system implemented using a server system comprising one or more hardware processors, the database system configurable to cause:
identifying a first user associated with a computing device as one of a set of internal users who are inside of a first organization and are members of an internal community maintained on behalf of the first organization using a database;
providing, to the computing device, a first level of access to the internal community responsive to identifying the first user as one of the set of internal users, the first level of access permitting the computing device to access first files stored in a database in association with the internal community and permitting the computing device to access a first forum providing one or more organized discussions associated with the internal community, the first forum maintained for the internal community using a database;
identifying the first user as a member of an external community maintained on behalf of the first organization using a database, the external community membership further comprising an external user who is outside of the first organization;
providing, to the computing device, a second level of access to the external community responsive to identifying the first user as a member of the external community, the second level of access permitting the computing device to access second files stored in a database in association with the external community and permitting the computing device to access a second forum providing one or more organized discussions associated with the external community, the second forum maintained for the external community using a database, the second level of access being restricted with respect to the first level of access, the second level of access restricting the external user from at least: being a community owner, creating a new community, following in the enterprise social networking system one or more designated people who can be followed according to the first level of access, seeing a public forum, seeing a public or moderated community, seeing a public file, seeing or searching a company directory, seeing the internal community, accessing the first files, and accessing an internal user profile; and
identifying the first level of access and the second level of access using one or more data objects in a database.

2. The enterprise social networking system of claim 1, the second level of access further restricting the external user from one or more of: accessing the first forum, finding people, seeing recommended content or people, or accessing a profiles menu.

3. The enterprise social networking system of claim 1, the second level of access further permitting the external user to perform one or more of: collaborating fully as a member of the external community, following a community, viewing and downloading a shared file, editing a file, joining a meeting, seeing an activity stream, editing a user profile, viewing contact information of a person who shares content, or sharing a file.

4. The enterprise social networking system of claim 1, the database system further configurable to cause:
providing one or more indicators for display at the computing device in a user interface associated with the external community, the one or more indicators comprising an alert indicating the presence of the external user.

5. The enterprise social networking system of claim 1, wherein the internal community is associated with an internal network restricted to users inside of a domain of the first organization, and the external community is associated with an external network open to users outside of a domain of the first organization.

6. The enterprise social networking system of claim 1, wherein the first level of access further permits the computing device to:
follow one or more of the first files, and
share one or more of the first files.

7. The enterprise social networking system of claim 1, wherein the internal community is accessible to the computing device at a first network address comprising first branding information identifying the first organization by a first brand, and the external community is accessible to the computing device at a second network address comprising second branding information identifying a second organization by a second brand.

8. A computer program product comprising computer-readable program code capable of being executed by one or more processors when retrieved from a non-transitory computer-readable medium, the program code comprising instructions configurable to cause:
identifying a first user associated with a computing device as one of a set of internal users who are inside of a first organization and are members of an internal community maintained on behalf of the first organization using a database;
providing, to the computing device, a first level of access to the internal community responsive to identifying the first user as one of the set of internal users, the first level of access permitting the computing device to access first files stored in a database in association with the internal community and permitting the computing device to access a first forum providing one or more organized discussions associated with the internal community, the first forum maintained for the internal community using a database;
identifying the first user as a member of an external community maintained on behalf of the first organization using a database, the external community membership further comprising an external user who is outside of the first organization;
providing, to the computing device, a second level of access to the external community responsive to identifying the first user as a member of the external community, the second level of access permitting the computing device to access second files stored in a database in association with the external community and permitting the computing device to access a second forum providing one or more organized discussions associated with the external community, the second forum maintained for the external community using a database, the second level of access being restricted with respect to the first level of access, the second level of access restricting the external user from at least: being a community owner, creating a new community, following in an enterprise social networking system one or more designated people who can be followed according to the first level of access, seeing a public forum, seeing a public or moderated community, seeing a public file, seeing or searching a company directory, seeing the internal community, accessing the first files, and accessing an internal user profile; and identifying the first level of access and the second level of access using one or more data objects in a database.

9. The computer program product of claim 8, the second level of access further restricting the external user from one or more of: accessing the first forum, finding people, seeing recommended content or people, or accessing a profiles menu.

10. The computer program product of claim 8, the second level of access further permitting the external user to perform one or more of: collaborating fully as a member of the external community, following a community, viewing and downloading a shared file, editing a file, joining a meeting, seeing an activity stream, editing a user profile, viewing contact information of a person who shares content, or sharing a file.

11. The computer program product of claim 8, the instructions further configurable to cause:
providing one or more indicators for display at the computing device in a user interface associated with the external community, the one or more indicators comprising an alert indicating the presence of the external user.

12. The computer program product of claim 8, wherein the internal community is associated with an internal network restricted to users inside of a domain of the first organization, and the external community is associated with an external network open to users outside of a domain of the first organization.

13. The computer program product of claim 8, wherein the first level of access further permits the computing device to:
follow one or more of the first files, and
share one or more of the first files.

14. The computer program product of claim 8, wherein the internal community is accessible to the computing device at a first network address comprising first branding information identifying the first organization by a first brand, and the external community is accessible to the computing device at a second network address comprising second branding information identifying a second organization by a second brand.

15. A method comprising:
identifying a first user associated with a computing device as one of a set of internal users who are inside of a first organization and are members of an internal community maintained on behalf of the first organization using a database;
providing, to the computing device, a first level of access to the internal community responsive to identifying the first user as one of the set of internal users, the first level of access permitting the computing device to access first files stored in a database in association with the internal community and permitting the computing device to access a first forum providing one or more organized discussions associated with the internal community, the first forum maintained for the internal community using a database;
identifying the first user as a member of an external community maintained on behalf of the first organization using a database, the external community membership further comprising an external user who is outside of the first organization;
providing, to the computing device, a second level of access to the external community responsive to identifying the first user as a member of the external community, the second level of access permitting the computing device to access second files stored in a database in association with the external community and permitting the computing device to access a second forum providing one or more organized discussions associated with the external community, the second forum maintained for the external community using a database, the second level of access being restricted with respect to the first level of access, the second level of access restricting the external user from at least: being a community owner, creating a new community, following in an enterprise social networking system one or more designated people who can be followed according to the first level of access, seeing a public forum, seeing a public or moderated community, seeing a public file, seeing or searching a company directory, seeing the internal community, accessing the first files, and accessing an internal user profile; and
identifying the first level of access and the second level of access using one or more data objects in a database.

16. The method of claim 15, the second level of access further restricting the external user from one or more of: accessing the first forum, finding people, seeing recommended content or people, or accessing a profiles menu.

17. The method of claim 15, the second level of access further permitting the external user to perform one or more of: collaborating fully as a member of the external community, following a community, viewing and downloading a shared file, editing a file, joining a meeting, seeing an activity stream, editing a user profile, viewing contact information of a person who shares content, or sharing a file.

18. The method of claim 15, further comprising:
providing one or more indicators for display at the computing device in a user interface associated with the external community, the one or more indicators comprising an alert indicating the presence of the external user.

19. The method of claim 15, wherein the internal community is associated with an internal network restricted to users inside of a domain of the first organization, and the external community is associated with an external network open to users outside of a domain of the first organization.

20. The method of claim 15, wherein the first level of access further permits the computing device to:
follow one or more of the first files, and
share one or more of the first files.

* * * * *